US008709305B2

(12) United States Patent
Sarkar

(10) Patent No.: US 8,709,305 B2
(45) Date of Patent: Apr. 29, 2014

(54) LASER PROTECTION POLYMERIC MATERIALS

(75) Inventor: Abhijit Sarkar, Midland, MI (US)

(73) Assignee: Oxazogen, Inc., Midland, MI (US)

( * ) Notice: Subject to any disclaimer, the term of this patent is extended or adjusted under 35 U.S.C. 154(b) by 462 days.

(21) Appl. No.: 13/186,948

(22) Filed: Jul. 20, 2011

(65) Prior Publication Data

US 2012/0175571 A1    Jul. 12, 2012

Related U.S. Application Data

(62) Division of application No. 12/922,479, filed as application No. PCT/US2009/001602 on Mar. 13, 2009.

(60) Provisional application No. 61/069,439, filed on Mar. 14, 2008.

(51) Int. Cl.
| | |
|---|---|
| *F21V 9/00* | (2006.01) |
| *G02B 5/02* | (2006.01) |
| *G02C 7/10* | (2006.01) |
| *G02F 1/361* | (2006.01) |
| *G03B 11/00* | (2006.01) |
| G02B 5/23 | (2006.01) |
| B60C 1/00 | (2006.01) |
| C08K 3/04 | (2006.01) |
| G02B 5/22 | (2006.01) |

(52) U.S. Cl.
USPC ........... 252/582; 252/586; 359/885; 524/496; 977/735; 977/742; 977/750; 977/752; 977/779; 977/810; 977/902

(58) Field of Classification Search
USPC .................. 252/582, 586; 359/885; 524/496; 977/735, 742, 750, 752, 773, 779, 810, 977/902
See application file for complete search history.

(56) References Cited

U.S. PATENT DOCUMENTS

| | | | |
|---|---|---|---|
| 5,741,442 | A | 4/1998 | McBranch et al. |
| 6,522,447 | B2 | 2/2003 | Wang et al. |

(Continued)

FOREIGN PATENT DOCUMENTS

| | | |
|---|---|---|
| WO | 2005096726 | 10/2005 |
| WO | 2007042913 | 4/2007 |

OTHER PUBLICATIONS

Salma Rahman, Shamim Mirza, Abhijit Sarkar, and George W. Rayfield, Design and Evaluation of Carbon Nanotube Based Optical Power Limiting Materials, J. Nanosci. Nanotechnol. 2010, vol. 10, No. 8, Copyright © 2010 American Scientific Publishers.*

(Continued)

*Primary Examiner* — Bijan Ahvazi
(74) *Attorney, Agent, or Firm* — Technology Law, PLLC; Karen L. Kimble

(57) ABSTRACT

This invention concerns a polymer coating material composition (PCM) comprising as components a Polymer Matrix, carbon nanotubes (CNT) as optical power limiters (OPL), and carbon-rich molecules. One aspect of the invention is where the Polymer Matrix is a hyperbranched polymer, such as a hyperbranched polycarbosiloxane polymer. Another aspect of the invention is where the CNT is a short multiwall carbon nanotube (sMWNT). A further aspect of the invention is where the carbon-rich molecules are triethoxysilyl anthracene derivatives.

The composition wherein the ratio in weight percent of Polymer Matrix to CNT to carbon-rich molecule is from 94:3:3 to 99.8:0.1:0.1.

The composition can further contain one or more of multi-photon absorbers (MPA) chromophores or reverse saturable absorbers (RSA) chromophores.

These compositions can be used as: a) a film, b) a coating, c) a liquid, d) a solution, or e) a sandwiched film between two transparent substrates.

23 Claims, 13 Drawing Sheets

(a)

(b)

(56) References Cited

U.S. PATENT DOCUMENTS

| | | |
|---|---|---|
| 6,620,863 B1 | 9/2003 | McLean et al. |
| 6,646,089 B2 | 11/2003 | Dvornic et al. |
| 7,071,279 B2 | 7/2006 | Liao |
| 2002/0024752 A1 | 2/2002 | Ando et al. |
| 2003/0142397 A1 | 7/2003 | Ando et al. |
| 2007/0107629 A1 | 5/2007 | Zheng et al. |

OTHER PUBLICATIONS

Abhijit Sarkar, Salma Rahman, Shamim Mirza, George W. Rayfield, and Edward W. Taylor,Multifunctional composite materials for optical power limiting applications in space environments, Journal of Nanophotonics, vol. 3, 031890 (Nov. 5, 2009), © 2009 Society of Photo-Optical Instrumentation Engineers.*

Min Xu, Tao Zhang, Bing Gu, Jieli Wu, and Qun Chen, Synthesis and Properties of Novel Polyurethane-UrealMultiwalled Carbon Nanotube Composites, Macromolecules 2006, 39, 3540-3545, © 2006 American Chemical Society.*

Brennan, et al., Proceedings of the SPIE, 4876, 649-658 (2003) Abstract ptovided.

Izard et al., Chem. Phys. Lett. 391, 124-128 (2004).

Chin et al., J. Mater. Res. 21, 2758-2766 (2006).

Mishra et al., Chem. Phys. Lett. 317, 510-514 (2000).

O'Flaherty et al., J. Opt. Soc. Am. B, 20, 49-57 (2003).

Xu et al., Macromolecules 39, 3540-3545 (2006).

Chem, P. et al., Phys. Rev. Lett. 82, 2548-2551 (1999).

Kost et al., Optics Letters 18, 334-336 (1993).

Brusatin, G. et al., J. Sol.-Gel Sci. Technol. 8, 609-613 (1997).

Lee et al., Org. Letts. 72(2), 323-326 (2004).

Brusatin, G. et al., J. Sol.-Gel Sci. Technol. 22, 189-204 (2001).

\* cited by examiner

LASER PROTECTION POLYMERIC MATERIALS

CROSS REFERENCE TO RELATED APPLICATIONS

This application is a divisional application of U.S. Ser. No. 12/921,479, filed Sep. 14, 2010, which is a 371 application of PCT/US2009/001602, filed 13 Mar. 2009, which claims benefit from U.S. Provisional 61/069,439, filed 14 Mar. 2008.

FEDERALLY SPONSORED RESEARCH STATEMENT

This invention was made with Government support under Award No. W56HZV-07-C-0066, for U.S. Army Tank & Automotive Command (TACOM) by Oxazogen, Inc. and Government support under Award No. W56HZV-07-C-0522, for U.S. Army Tank & Automotive Command (TACOM) by Oxazogen, Inc. The Government has certain rights in this invention.

BACKGROUND OF THE INVENTION

1. Field of the Invention

This invention generally concerns protection from laser radiation for optical equipment and human eyes and anything else requiring such protection.

2. Description of Related Art

Laser light is a high intensity monochromatic radiation having extremely high coherence. An increasingly large number of applications based on lasers are currently available. Most applications in the consumer sector incorporate low intensity lasers such as compact discs, DVDs and other optical devices, while high intensity lasers largely remain in the research, medical, defense, industrial, nuclear and astronomy sectors. Low energy lasers are very commonly used in law enforcement and warfare for target illumination.

Development of low as well as high power laser systems has reached the maturity where such systems are economically and technically feasible. The main requirement for protection against laser damage of optical receptors, especially in the case of high sensitivity devices, is high transparency under low intensity and ambient conditions combined with opacity under high intensity radiation.

Typically, there are two ways to protect optically sensitive materials against damage caused by overexposure to high intensity light; i.e., active and passive. The active approach is based on "smart structures" comprising electronic circuitry that reacts when a harmful intensity of light is detected and activates mechanical barriers between the light source and the optically sensitive material. The passive approach relies on the inherent property of the material to form a light barrier and prevent transmission of light when its intensity surpasses a threshold value.

Optical power limiters (OPLs) are materials and devices designed to allow normal transmission of light at low intensities and limited transmission of light of higher intensities. A barrier is formed as a direct response of such a material to excessive intensity of light. There are various important considerations that go into the design of an OPL device. The speed at which light travels dictates that an OPL device must be able to react almost instantaneously to changing light intensity. Fast response time favors a materials-based device over a mechanical one. The material must be able to bear the brunt of prolonged exposure to high intensity light, as well as allow for continuous transparency in regions outside the path of the high intensity light. All these factors favor a device incorporating a solution or film of molecules, which acts as a stand-alone optical limiter. Examples of OPL are found in U.S. Pat. Nos. 7,071,279; 6,620,863; 6,522,447; 5,741,442; and US Published Applications 2003/0142397; 2002/0024752; 2007/0107629; and PCT published applications WO/2007/042913 and WO/2005/096726. References that may be of assistance are Brennan, et al., Proceedings of the SPIE, 4876, 649-658 (2003). Izard et al., *Chem. Phys. Lett.* 391, 124-128 (2004); Chin et al., *J. Mater. Res.* 21, 2758-2766 (2006); Mishra et al., *Chem. Phys. Lett.* 317, 510-514 (2000); O'Flaherty et al., *J. Opt. Soc. Am.* B, 20, 49-57 (2003); Xu et al., *Macromolecules* 39, 3540-3545 (2006); Chen, P. et al., *Phys. Rev. Lett.* 82, 2548-2551 (1999); Kost et al., *Optics Letters* 18, 334-336(1993); and Brustin, G. et al., *J. Sol-Gel Sci. Technol.* 8, 609-613 (1997).

In order to be used for practical applications, an OPL material must fulfill the following requirements:
1. It must have a fast response time;
2. It should operate over a broad wavelength range; and
3. The on-off cycle must be extremely fast and ideally it should follow the speed of the cycle of the laser pulse it is responding to.

Optical power limiting devices rely on one or more nonlinear optical (NLO) mechanisms, which include:
1. Excited State Absorption (ESA) or Reverse Saturable Absorption (RSA);
2. Two-Photon Absorption (TPA);
3. Multi-Photon Absorption (MPA);
4. Nonlinear Refraction;
5. Induced Scattering;
6. Photorefraction;
7. Beam Diffusion; and
8. Nonlinear Scattering.

Nonlinear processes such as excited state or reverse saturable absorption, two-photon and multi-photon absorption, nonlinear refraction, beam diffusion and nonlinear scattering for various materials have been extensively studied for OPL applications. To date, however, there is not yet a single OPL material available which, taken individually, can provide ideal and smooth attenuation of an output beam. Therefore, the design and development of radically novel types of materials for OPL is required. In this regard, some attempts were made with combinations of nonlinear optical materials in cascading geometries, such as multi-plate or tandem cells and use of two intermediate focal planes of a sighting system [see Miles, P. A., *Appl. Opt.* 33, 6965 (1994); and Van Stryland, E. W. et al., *Nonlinear Opt.* 27, 181 (2001)].

The human eye is a very sensitive optical sensor with a very low damage threshold for the retina (~1 µJ). This imposes stringent demands on materials for laser protection. Existing nonlinear optical materials can respond to such low energies only when the light is tightly focused—this is achieved most easily in an optical system which provides focal planes at which the nonlinear material can be positioned. Protection applications demand materials with the following characteristics:
1. High linear transmission across the response band of the sensor;
2. Sensitive nonlinear response to a wide variety of pulse length;
3. Resistance to permanent optical damage; and
4. Stability in the working environment.

In order to devise such a system various methods have been tried.

Organic materials, such as pthalocyanine derivatives, fullerene, etc. have been found suitable for exhibiting relatively good OPL effects with fast response time. However, these materials have inherent properties that are not appropriate for practical use. For example, they are not stable at high temperatures caused by laser irradiation and will decompose and lose their OPL effect. Moreover, production of designer organic materials for OPL is usually complicated and they can be produced in small quantities only.

Photochromic materials, which reversibly change color in response to light, have also been investigated as OPL materials. The problem with these materials is their slow response. Also, they change their OPL character over time since they keep on responding to weak light (such as ambient light).

Prior art optical limiters use a liquid limiter where chromophores are dissolved in suitable solvents (generally organic solvents). The problems with such limiters are manifold. First, the chromophore concentration cannot be kept constant over time which means the transmittance changes. The chromophores tend to aggregate over time and as a result lose OPL effectiveness. When laser irradiation occurs, the solution starts to move around which makes it difficult to control the refractive index of the medium. Also, it is cumbersome to handle and use liquid limiters in practical devices.

A wide variety of materials, potentially usable as optical limiters, has been tested, including:
 Transition metal cluster compounds, such as iron carbonyl cluster compounds, which were blended into a polymer to provide an optical limiting device (see U.S. Pat. No. 5,283,697);
 Fullerenes, (see U.S. Pat. Nos. 5,391,329 and 5,741,442); and
 Metalloporphyrin and metallophthalocyanine complexes, e.g., lead tetrakis(4-cumylphenoxy)phthalocyanine, which have the strongest RSA effects to date [see J. S. Shirk et al., *Appl. Phys. Lett.* (63)14, 1880-1882 (1993); and U.S. Pat. No. 5,805,326].

Some of these complexes were dissolved in poly(methylmethacrylate) (PMMA) and in polystyrene to provide "optical limiter structures". While these structures can be used as high intensity light attenuators, they are also subject to damage from high intensity light.

Thus, there remains a need for optical limiting devices with superior properties. Therefore, an aspect of the present invention is to provide a method for preparing optical limiting devices that exhibit a strong RSA effect and that are less subject to damage from high intensity light than known devices.

BRIEF SUMMARY OF THE INVENTION

This invention relates to a polymer coating material composition (PCM) comprising as components:
 1) a Polymer Matrix, and
 2) carbon nanotubes (CNT) as optical power limiters (OPL); and
 3) carbon-rich molecules.

The composition can further contain one or more of the following:
 4) a multi-photon absorber (MPA), such as stilbene-3 or 2,2'-[1,4-phenylene)bis(5-phenyloxazole)] (POPOP), and
 5) reverse saturable absorption chromophores such as $C_{60}$ and HITCI and their derivatives, or polyenes.

For the Polymer Matrix, one preferred polymer is a hyperbranched polymer, such as hyperbranched polycarbosiloxane polymer (HB-PCS) and its trimethoxysilyl functionalized derivative, polyureas, polyurethanes, polysiloxanes, polycarboxysilanes, polycarbosiloxanes, reactive polymers having reactive amino, carboxylic acid, cyano, isocyanate, hydroxyl, or similarly reactive entities. The Polymer Matrix can be a liquid or a solid depending on the polymer selected and the conditions.

The CNTs are single wall carbon nanotubes (SWNT), double wall carbon nanotubes (DWNT), multiwall carbon nanotubes (MWNT), or combinations of lengths and types of all CNTs.

A further aspect of this invention is the use of combinations of at least 1 of each of required components 1-3 above in the composition plus optionally 1 or more of these optional 4 and 5 components (e.g., components 1-3 and 5; 1-3 and 4; 1-3 and 4 and 5 etc.), in order to enable different optical power limiting (OPL) mechanisms to provide in a synergistic manner efficient protection from laser beam damage. Another aspect of this invention is to provide OPL by use of carbon nanotubes in a PCM rather than in a solvent-based system. The coating made from this composition is a solid and is usually prepared as a liquid that becomes a solid (using a solvent or a liquid polymer to blend the components).

These PCM are applied as: a) films, such as thick films >100 microns and thin films of <100 microns, b) coatings, c) liquids, d) solutions, e) sandwiched films between two transparent substrates, such as plastic and/or glass.

DETAILED DESCRIPTION OF THE INVENTION

Glossary

Figure 1:
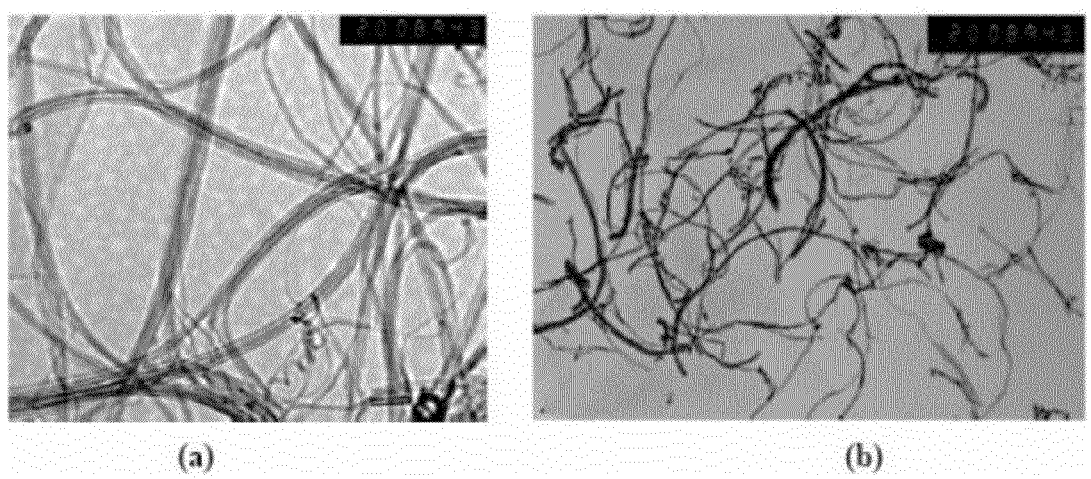
FIG. 1 is a copy of a photomicrograph of (a) SWNTs (>90 wt % purity, 1 to 2 nm OD, 5 to 30 µm length); (b) sMWNTs (>95 wt % purity, 20 to 30 nm OD, 0.5 to 2.0 µm length).

The following terms as used in this application are to be defined as stated below and for these terms, the singular includes the plural.

APMS means 3-aminopropyl trimethoxysilane.

CB means carbon black.

CNT means carbon nanotube(s); used from a commercial supplier such as Cheap Tubes, Inc.; purity ≥90%, outer diameter=1-50 nm; and includes SWNT, sSWNT, DWNT, MWNT, and sMWNT Coating means the polymer coating prepared from the compositions of this invention.

DSC means differential scanning calorimetry.

DMF means dimethylformamide.

DWNT means double wall carbon nanotube(s); used from a commercial supplier such as Cheap Tubes, Inc.; purity ≥90%, number of walls=2, outer diameter=1-2 nm, inside diameter=0.8-1.6 nm, length=5-30 μm; optional functionalization with hydroxyl or carboxylic groups=~2-4%.

ESA means excited state absorption.

FTIR means Fourier Transform Infrared Spectroscopy.

h means hours.

HB or HBP means hyperbranched polymer.

HB-PCS means hyperbranched polycarbosiloxane polymer.

HIDCI means 1,1',3,3,3',3'-hexamethylindodicarbocyanine iodide.

HITCI means 1,1',3,3,3',3'-hexamethylindotricarbocyanine iodide.

min means minutes.

MPA means multi-photon absorber or multi-photon absorption.

MWNT means multiwall carbon nanotube(s); used from a commercial supplier such as Cheap Tubes, Inc.; purity ≥95%, number of walls=≥3, outer diameter=8-50 nm, inside diameter=2.5-10 nm, length=2.5-20 μm; optional functionalization with hydroxyl or carboxylic groups=~2-4%.

sMWNT means short multiwall carbon nanotube(s); used from a commercial supplier such as Cheap Tubes, Inc.; purity ≥95%, number of walls=≥3, outer diameter=8-50 nm, inside diameter=2.5-10 nm, length=0.5-2 μm; optional functionalization with hydroxyl or carboxylic groups=~2-4%.

NLO means nonlinear optics.

OPL means optical power limiting or optical power limiters.

PCM means polymer coating material as a liquid or solid film.

Polymer Matrix means linear, branched, grafted, dendritic or hyperbranched polymers that contain two or more crosslinkable groups, including but not limited to polyamides, polyureas, polyurethanes, polysiloxanes, polycarboxysilanes, and polymers containing amino, carboxylic acid, cyano, isocyanate, hydroxyl and similarly reactive groups. This Polymer Matrix may be a solid or a liquid.

POPOP means 1,4-bis(5-phenyloxazoyl-2-yl)benzene.

RSA means reverse saturable absorption.

SEM-EDS means Scanning Electron Microscopy coupled with Electron Diffraction Spectroscopy.

SWNT means single wall carbon nanotube; used from a commercial supplier such as Cheap Tubes, Inc.; purity ≥90%, outer diameter=1-2 nm, inside diameter=0.8-1.6 nm, length=5-30 μm; optional functionalization with hydroxyl or carboxylic groups=~2-4%.

sSWNT means short single wall carbon nanotubes; used from a commercial supplier such as Cheap Tubes, Inc.; purity ≥90%, outer diameter=1-2 nm, inside diameter=0.8-1.6 nm, length=0.5-2 μm; optional functionalization with hydroxyl or carboxylic groups=~2-4%.

THF means tetrahydrofuran.

TPA means two-photon absorber or two-photon absorption.

TPP means tetraphenyl porphyrin.

Discussion

In this invention, a Polymer Matrix, especially as a proprietary HB-PCS, that forms excellent optical quality films and coatings has been used as the host material in laser blocking. The laser blocking is useful in:

Protection of eyes and sensors from damage due to intense light (such as laser radiation);

Devices for protecting optical detectors against high-intensity optical radiation;

Protection of light sensitive objects from intense laser beams;

Protection of detector circuits (such as infrared detectors) against high power (intense) light;

Protection of photo-detectors from high intensity optical radiation;

Protection of image intensifiers or infrared detectors; and

Cameras and telescopes.

For a PCM to work as a laser-blocking material, an appropriate choice of active components is necessary and the appropriate formulation of the PCM.

A PCM of the present invention is made using as components: 1) a Polymer Matrix, and 2) carbon nanotubes (CNTs), and 3) carbon-rich molecules. Optionally one or more of the following OPLs can be added: 4) MPA chromophores, and 5) RSA chromophores. A further aspect of this invention is the use of a combination of at least 3 different OPL mechanisms, originating from the above mentioned required components 2 and 3 plus at least one of components 4 and 5, in a synergistic manner to provide efficient protection from laser beam damage. An aspect of this invention is to provide OPL by use of carbon nanotubes in a solid system or a non-solvent containing liquid system in a PCM.

These PCM are applied as: a) films, such as thick films >100 microns and thin films of <100 microns, b) coatings, c) liquids, d) solutions, e) sandwiched films between two transparent substrates, such as plastic and/or glass.

Materials and Methods

Required Components

Polymer Matrix

Any linear or cross linked polymer that contains two or more crosslinking groups can be used as the Polymer Matrix. This includes, but is not limited to polyamides, polyureas, polyurethanes, polyesters, polysiloxanes, polycarboxysilanes, polycarbosiloxanes, and polymers containing amino, carboxylic acid, cyano, isocyanate, epoxide, hydroxyl and similarly reactive groups. The preferred polymer matrices are hyperbranched polycarboxysilanes, polycarbosiloxanes, or hyperbranched polyurea siloxanes. Specifically preferred are hyperbranched polycarboxysilanes or polycarbosiloxanes, or their methoxysilyl functionalized derivatives, such as tri-, di- or mono-methoxysilyl functionalized derivtives. These polymers are known for example from U.S. Pat. Nos. 6,543,600; 6,812.298; 6,384,172; 6,646,089 and 6,995,215.

CNT

Short length (i.e., about 0.1μ to about 5μ diameter; about 1 nm to about 30 nm long) sMWNT were found to perform very advantageously for these applications. However, combinations of varying length CNT, MWNT and/or SWNT are also possible. Mixtures of SWNT, sSWNT, DWNT, MWNT and/or sMWNT, all either functionalized or not, can be used. However, it is preferred to use all one single type of CNT. The preferred length is 0.5-2 μm HB-PCS and its trimethoxylsilyl functionalized derivative were made and a blend of these polymers was optimized for use as transparent polymer coatings. Other functionalized CNTs contain —$NH_2$, —NCO, —COOH, —COCl, —OH, siloxane, esters and other such moieties.

Carbon-Rich Molecules

Carbon-rich molecules are also optional additives to the present composition. Carbon-rich molecules are known to liberate carbon as a decomposition product when irradiated with intense laser beams. Therefore, incorporation of carbon-rich organic molecules in addition to functionalized CNT, MPA and RSA provides an additional mechanism for protection against high intensity lasers. The mechanism of protection in this case is via instant blackening due to high energy mediated decomposition of the carbon-rich molecule into carbon.

The preferred carbon-rich molecules are one or more of the following:

(1) Anthracene derivative with the following structure

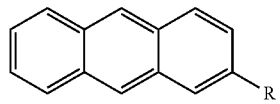

where, R=functional moeity (such as amine, carbocxylate) for covalent bonding with polymermatrix and/or with CNTs Functionalized Anthracene (2) Diacetylenes of the following general structure

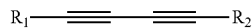

where $R_1$ and $R_2$ are substituents, such as benzene, naphthalene, etc.

(3) Polyaromatic hydrocarbons (such as fluorene, etc.)

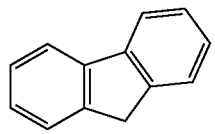 [SMILES: c1ccc2c(c1)Cc1ccccc1-2]

and (4) Graphene and graphidyne macrocycles

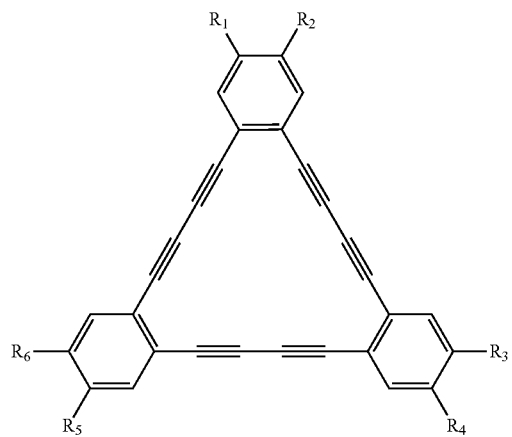

Specificallly preferred carbon-rich molecules are diacetylene and polydiacetylenes.

Notably, these carbon-rich molecules should also act as MPA chromophores when the substituents ($R_1$ through $R_4$) are chosen to form donor-acceptor pairs.

When the composition contains the three required components, the ratio in weight percent of Polymer Matrix to CNT to carbon-rich molecules is from 94:3:3 to 99.8:0.1:0.1, with 99.0:0.5:0.5 to 99.75:0.125:0.125 preferred.

Optional Components

RSA Chromophores

RSA may occur whenever the excited-state absorption cross section of a molecule is larger than its ground-state absorption cross section at the input wavelength. Under appropriate conditions, the population accumulates in the lowest triplet state during the exposure to a strong light source and it provides an increasing concentration to the total absorption of the system. As a result, the output radiation is attenuated. The significant parameters for the effectiveness of this mechanism are the excited state lifetimes, the inter state crossing time, and the values of the excited state absorption cross sections.

RSA chromophores or RSA absorbers are therefore useful additives to the present composition. Organic and organometallic molecules such as HITCI, metal TPP such as Zinc-TPP, metal phthalocyanine such as lead phthalocyanine, and fullerene ($C_{60}$) can all be utilized as RSA chromophores. Several nanoparticles of metal and metal salts are also good RSA chromophores. Preferred RSA chromophores are HIDCI, HITCI, metal phthalocyanines, silver nanoparticles and fullerene ($C_{60}$).

When the composition contains the three required components and the RSA chrompohores, the ratio in weight percent of Polymer Matrix to CNT to carbon-rich molecules to RSA chromophores is from 91:3:3:3 to 99.7:0.1:0.1:0.1.

MPA Chromophores

MPA chromophores are also additives that can be useful in the present composition. An organic or organometallic molecule having donor-acceptor moieties can be used as the MPA chromophore. Preferred MPA chromophores are stilbenes, such as stilbene-3, POPOP, and dansyl hydrazine.

When the composition contains the three required components and the MPA chrompohores, the ratio in weight percent of Polymer Matrix to CNT to carbon-rich molecules to MPA chromophores is from 91:3:3:3 to 99.7:0.1:0.1:0.1.

When the composition contains the three required components and the MPA chromophores and the RSA chromophores, the ratio in weight percent of Polymer Matrix to CNT to carbon-rich molecules to MPA chromophores to RSA chromophores is from 88:3:3:3:3 to 99.6:0.1:0.1:0.1:0.1.

Solvent (Optional)

The Polymer Matrix may be a liquid and can serve as the solvent. The OPL-active components can be blended into the Polymer Matrix from a solution or by a solvent-less process (neat). The solvents that can be used include, but are not limited to alcohols, ethers, chloroform, dimethylformamide, hexanes or ethyl acetate. Preferred solvents are methanol, isopropyl alcohol and chloroform. An especially preferred solvent is isopropyl alcohol.

Carboxylic acid-functionalized sMWNTs along with other dye components were successfully incorporated into the HBP blend. The combined solution contained particles less than 0.2 μm in length. The formulation of a PCM having the 3 to 5 components mentioned above was used to prepare a variety of films on ordinary as well as on BK7 glass plates.

When carbon nanotubes are in suitable solvents, OPL has been observed [see Chin et al., *J. Mater. Res.* 21, 2758-2766 (2006); and Mishra et al., *Chem. Phys. Lett.* 317, 510-514 (2000)]. This was explained by solvent bubble formation which scatters light at high fluence, as these nanotubes absorb incident light and transfer energy to the solvent to form the bubbles.

Use of PCM between 2 glass slides improved the polymer performance and reduced film fracture at high fluence levels. The PCM can be tailored to meet requirements of a wide variety of different optical systems, e.g., thickness of the film, optical densities by use of different sMWNT concentrations, and different OPL materials.

The invention will be further clarified by a consideration of the following examples, which are intended to be purely exemplary of the present invention.

EXAMPLE 1

Preparation of HB-PCS

The hyperbranched polymer HB-PCS was successfully prepared as shown in Scheme 1 below by methods described in U.S. Pat. Nos. 6,534,600 and 6,646,089 and *Polym. Prepr.* 45(1), 585 (2004).

A 100 mL 3-neck round-bottom flask equipped with a reflux condenser was charged with 1,3-divinyltetraethoxydisiloxane (7.999 g, 25.02 mmol) and tetrakis(dimethylsiloxy)silane (13.334 g, 40.56 mmol). It was flushed with $N_2$ and stirred for 5 min. Platinum-divinyltetramethyldisiloxane complex xylene solution (Karstedt catalyst, ~2% platinum in xylene) (0.0239 g) was added to the mixture. It was stirred at room temperature for 1 h and then heated in an oil bath at 50° C. for 22 h. The product was washed 5 times with 20 mL anhydrous acetonitrile. The volatiles were stripped off in a rotary evaporator at room temperature, and the colorless viscous oil product was dried under vacuum overnight. Yield: 15.21 g.

The polymer contains two types of functionalities. One is the —Si(OEt)$_n$ functionality present in the internal sites of the HBP and the other is —(SiMe$_2$H)$_m$ groups situated on the terminal sites of the HBP. The product was characterized by FTIR where signals at: 2971 cm$^{-1}$ and 2877 cm$^{-1}$ correspond to C—H stretching frequency present in the methyl (CH$_3$) group, 2132 cm$^{-1}$ (Si—O—Si stretching), 1254 (Si—CH$_3$), and 1076 and 773 (Si—O).

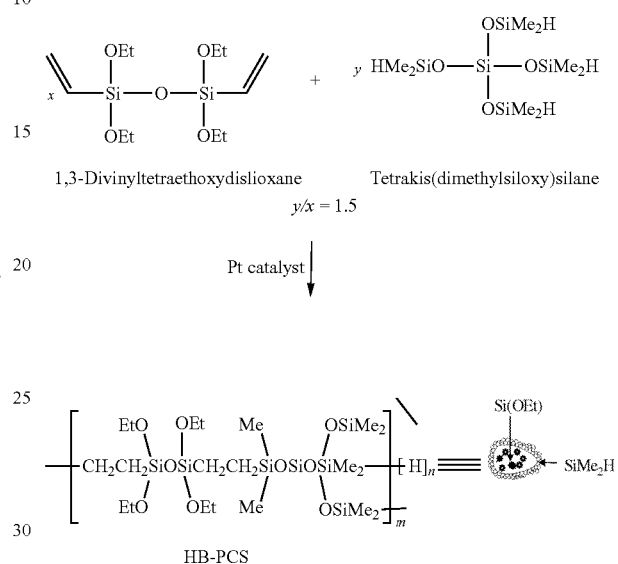

Scheme 1

EXAMPLE 2

Preparation of HB-PCS-trialkoxysilane

HB-PCS from Example 1 was also used to prepare the alkoxy derivative by end-capping with vinyltrimethoxysilane [CH$_2$=CHSi(OMe)$_3$] as shown below in Scheme 2. This polymer is the other component of the HBP network matrix.

A 100 mL round-bottom flask equipped with a reflux condenser was charged with HB-PCS(SiOEt)$_n$-(SiMe$_2$H)$_m$ (3.09 15 g, SiH 13.06 mmol) and vinyltrimethoxysilane (3.7832 g, 25.50 mmol). It was flushed with $N_2$ and stirred for 5 min. Karstedt catalyst (~2% platinum in xylene) (0.0175 g) was added to the mixture. It was stirred at room temperature for 1 h, and then heated in an oil bath at 50° C. for 16 h. FTIR of the crude product showed that the —SiH 2133 cm$^{-1}$ peak disappeared, indicating the reaction was complete. The product was slightly soluble in acetonitrile, so it was not washed. The volatiles were stripped off in a rotary evaporator at room temperature, and the colorless viscous oil product was dried under vacuum overnight. Yield: 4.85 g. It was also characterized by FTIR where signals at: 2959 cm$^{-1}$ and 2878 cm$^{-1}$ correspond to C—H stretching frequency present in the methyl (CH$_3$) group, 2132 cm$^{-1}$ (Si—O—Si stretching), 1256 (Si—CH$_3$), and 1086 and 795 (Si—O).

Scheme 2

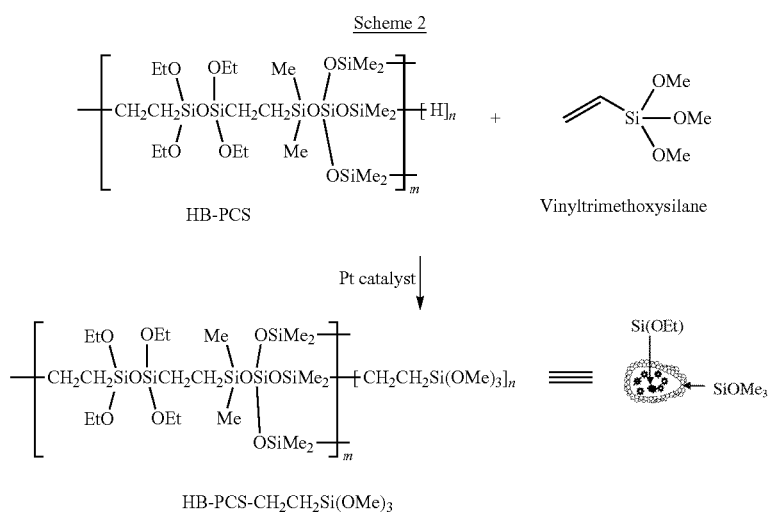

EXAMPLE 3

Functionalization of Anthracene

Anthracene was functionalized with triethoxysilyl groups via a one-step reaction process shown below in Scheme 3.

A 50 mL round-bottom flask was charged with 3-amino anthracene (0.19 g, 1 mmol), 3-isocyanatopropyl triethoxysilane (0.24 g, 1 mmol) and dry THF (10 mL). The reaction mixture was stirred for 12 h at room temperature under a $N_2$ atmosphere. THF (20 mL) was added and the reaction mixture was stripped off in a rotary evaporator at 50° C. The resultant product was lyophilized, i.e., drying at low pressure ($10^{-3}$ atm.) and low temperature (<−56° C.) to obtain dry material. The product was characterized by FTIR where the signals at: 3320 $cm^{-1}$ corresponds to the N—H stretching frequency present in the amide (NH—CO) group, 2971 $cm^{-1}$ and 2877 $cm^{-1}$ correspond to C—H stretching frequency present in the methyl ($CH_3$) group, 1639 $cm^{-1}$ (—C═O stretching), 1480 (-aromatic C—H), and 1076 and 742 (Si—O).

EXAMPLE 4

Preparation of Functionalized SWNT

The conversion of commercially available SWNT-COOH into their acid dichloride (COCl) derivative was successfully carried out as shown below in Scheme 4.

SWNT-COOH (1.0 g) in 100 mL of $SOCl_2$ was stirred with 1 mL of DMF at 70° C. for 24 h in a 250 mL round-bottom flask. The excess $SOCl_2$ was distilled off under reduced pressure and the residue was dried at room temperature under vacuum for 24 h. Yield: 1.2 g.

Both SWNT-COOH and the product (SWNT-COCl) were characterized by SEM-EDS. The SWNT-COOH sample showed a peak at 0.25 eV and 0.50 eV corresponding to carbon (C) and oxygen (O) atoms in the EDS spectrum. The peak for sulfur (S) was present in the instrument base line (substrate). For the SWNT-COCl sample, a new peak appeared at ~2.75 eV which corresponds to the chlorine (Cl) atom.

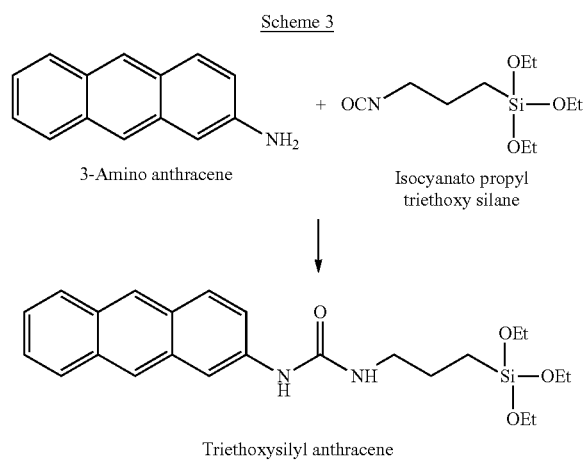

Scheme 3

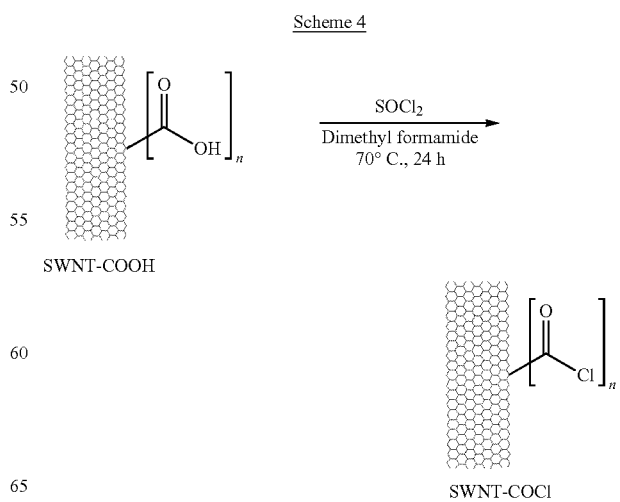

Scheme 4

EXAMPLE 5

SWNT-SiOR Complex

To incorporate the SWNT component into the HBP matrix the SWNT must be uniformly distributed within the bulk of the HBP Matrix without aggregation. Toward this goal, SWNT were functionalized with trimethoxy silyl, —Si(OMe)$_3$, groups which was expected to provide compatibility with the HBP used which contained triethoxy silane, Si(OEt)$_3$, functionalities. The SWNT-Siloxane complex was prepared following the reaction shown below in Scheme 5.

A 25 mL round-bottom flask was charged with SWNT-COCl (0.15 g, made as in Example 4), APMS (5.67 g, 31.6 mmol) and DMF (2 mL) to dissolve the SWNTs. The reaction mixture was stirred for 48 h at 100° C. under a N$_2$ atmosphere. The reaction products included SWNT-SiOR complex and excess unreacted APMS, which were removed by washing the reaction mixture 5 times. The volatiles were then stripped off in a rotary evaporator at room temperature and the resulting product was lyophilized to obtain dry material.

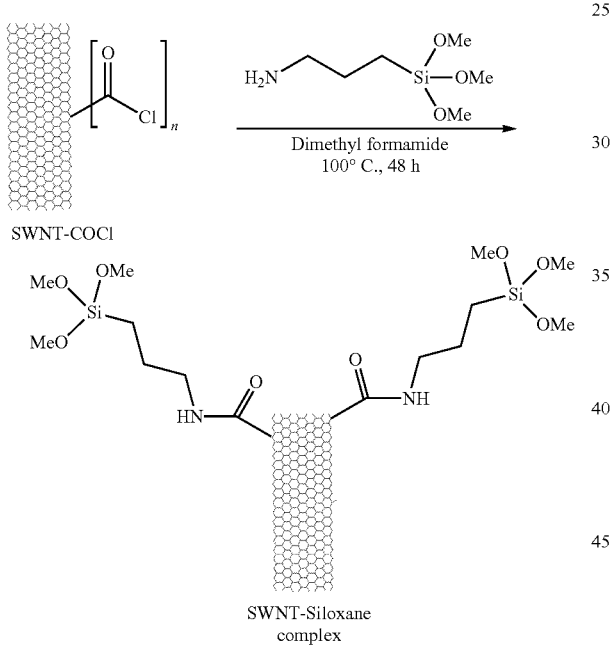

EXAMPLE 6

SWNT-Anthracene-SiOR Complex

Another SWNT-based complex was prepared where, in addition to the SiOR functionality, the carbon-rich molecule (anthracene) was covalently bonded to the SWNT by the reaction shown below in Scheme 6.

A 25 mL round-bottom flask was charged with SWNT-COCl (0.15 g, made as in Example 4), APMS (5.10 g, 28.4 mmol), 2-aminoanthracene (0.31 g, 1.6 mmol) and DMF (2 mL). The reaction mixture was stirred for 48 h at 100° C. under a N$_2$ atmosphere, then washed 5 times with methanol to remove unreacted APMS, and the volatiles were stripped off in a rotary evaporator at room temperature. The resultant product was lyophilized to obtain dry material.

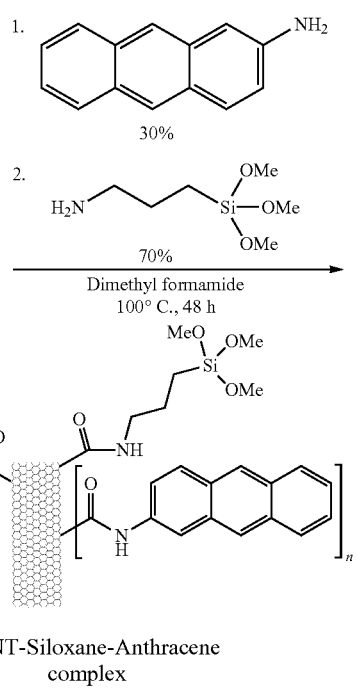

EXAMPLE 7

Preparation of HB-PCS Blend with COOH-Functionalized CNT

To successfully incorporate the CNT component into the HBP polymer, initially SWNTs functionalized with trimethoxysilyl, —Si(OMe)$_3$, groups was prepared and tried. This HBP also contained triethoxysilyl, Si(OEt)$_3$, groups and successful homogenization of these two components was expected via a sol-gel reaction of alkoxy functionalities.

Indeed, the suspension obtained following the ultrasonication process (discussed below) was easily filtered through a 2.7 μm filter, but when the filtrate was passed through a 0.45 μm or a 0.2 μm filter, the carbon nanotubes were held back and a clear HBP filtrate was obtained. The reason for this was in the high aspect ratio of SWNTs, which had diameters of 1 to 2 nm, but were as long as 30 microns (see FIG. 1a). It also turned out that these SWNTs could not be broken into smaller particles even when mechanical homogenizer and ultrasonication processes were used. Because of this, commercially available sMWNTs surface-functionalized with carboxylic acid groups (sMWNT-COOHs) with a much smaller aspect ratio were used to replace the SWNTs. The blend was prepared from the HB-PCS made by Example 1 and commercially available MWNT-COOH which had a diameter of 20 to 30 nm and lengths of 0.5 to 2.0 microns (see FIG. 1b).

The OPL occured when these MWNT were dispersed in a HB-PCS host where they absorbed incident light and converted the polymer into a state that scattered it without the presence of a liquid. These PCM exhibited excellent response to laser input energy focused on the film. The OPL onset occurred at less than ~1 μJ while clamping occurred at ~10 μJ. Approximately 99% attenuation (OD=2) was observed at the highest input energy.

In order to obtain a homogeneous liquid suspension of nano-sized particles of sMWNT-COOH in HB-PCS, a 2-stage mixing procedure consisting of mechanical homogenization followed by ultrasonication was developed. Equal amounts of HBP and functionalized CNT were taken in two separate beakers. In beaker A, the mixture was stirred and then mechanically agitated using a homogenizer. In beaker B, the content was subjected to homogenization followed by ultrasonication. Both solutions were allowed to stand. The contents of beaker A phase-separated into a clear supernatant and a thin black layer within 30 mins. In contrast, the contents of beaker B remained a suspension even after ~1.5 years of standing.

Mixing of HB-PCS and sMWNT-COOH was performed using a mechanical homogenizer to break down the sMWNT-COOH component into smaller particles. Following this, the solution was subjected to ultrasonication using a probe and this process was repeated twenty times to get a fully homogenized nano-suspension. This two-step mixing process results in exfoliation, i.e., separation of sMWNT strands followed by formation of sMWNTs nanoparticles and formation of their stable suspension in HBP as shown below. The suspension obtained from the ultrasonication process was passed through a 2.7 μm pre-filter and then through 0.45 μm and 0.2 μm filters to obtain a stable black suspension of sMWNTs in HB-PCS.

EXAMPLE 8

Preparation of Other HB-PCS Suspensions with 0.2 μm and 0.45 μm Particles

Using the procedure described in Example 7, the following suspensions were prepared.

(a) HB-PCS suspension with triethoxyanthracene particles
    Before filtration, the suspension was brown. The filtered suspension was pale yellow. This gives an indication that the filtration has removed larger particle sizes.

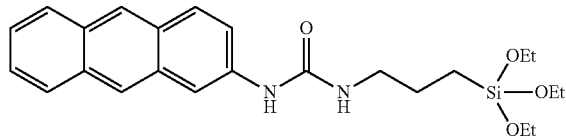

Triethoxysilyl anthrancene (b) HB-PCS suspension with stilbene-3 particles
    Before filtration, the suspension was slightly opaque. After filtration the suspension was clear. This indicates that the filtration has removed larger particle sizes.

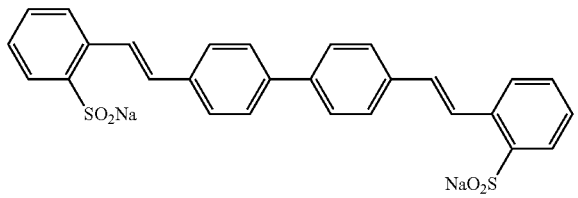

Stilbene-3

(c) HB-PCS suspension with POPOP particles
    Before filtration, the suspension was slightly opaque. After filtration, the suspension was clear. This indicates that the filtration has removed larger particle sizes.

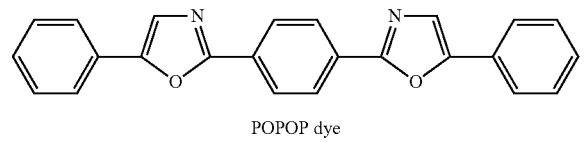

POPOP dye (d) HB-PCS suspension with a mixture of sMWNTs and stilbene-3 particles
    Before filtration, the suspension was black. A dark grey suspension was obtained after filtration. This indicates that the filtration has removed larger particle sizes.

(e) HB-PCS suspension with a mixture of sMWNTs and anthracene particles
    Before filtration, the suspension was black. A dark grey suspension was obtained after filtration. This indicates that the filtration has removed larger particle sizes.

(f) HB-PCS suspension with a mixture of sMWNTs, stilbene-3 and anthracene particles
    Before filtration, the suspension was black. A dark grey suspension was obtained after filtration. This indicates that the filtration has removed larger particle sizes.

(g) g HB-PCS suspension with a mixture of sMWNTs, POPOP and anthracene particles
    Before filtration, the suspension was black. A dark grey suspension was obtained after filtration. This indicates that the filtration has removed larger particle sizes.

(h) HB-PCS suspension with a mixture of sMWNTs and 1,1',3,3,3',3'-hexamethylindotricarbocyanine iodide (HITCI) particles
    Before filtration, the suspension was blue. A light blue suspension was obtained after filtration. This indicates that the filtration has removed larger particle sizes.

EXAMPLE 9

Preparation of Composite Films on Glass Substrate

The HBP network as the matrix for OPL components has to be conducive to various laser limiting and blocking mechanisms and have the following features:
1. Form a film/coating with excellent transparency throughout the visible broadband region (400 nm to 800 nm).
2. Form a film/coating on a variety of transparent substrates, including glass.
3. Be solid but become adequately soft by the heat generated by laser radiation.

The last requirement results from the fact that OPL (laser blocking) mechanisms in the system may include light scattering by bubble formation in the CNT's localized environment. Two requirements for such a mechanism to work fast and efficiently include transfer of energy from CNT to polymer network matrix and the ability of the Polymer Matrix to soften enough to form microbubbles by the energy gained from laser impingement.

Unless purposely oxidized, the Si—H functioned HB-PCS of Scheme 1 does not form a network film by a sol-gel reaction process. The ethoxysilyl groups present in the interior of these HBP molecules are sterically hindered and while capable of reacting, they are not able to produce a continuously crosslinked network. Hence, this polymer alone is not adequate for the matrix of laser blocking coatings. On the other hand, the HB-PCS-trialkoxysilyl material of Scheme 2 forms a hard Polymer Matrix upon curing by a sol-gel process, which represents the other extreme of network properties and is, therefore, also not suitable for the final coating systems. Consequently, only a combination of these two HBPs is able to provide a network matrix with adequate mechanical properties to satisfy all of the requirements listed above. When other polymers, such as polycarbonates are used, the film processing is carried out either by melt-bleading or by dissolving in suitable solvents (such as chloroform). Any transparent polymers, such as, PC or Epoxies, can be used as a Polymer Matrix. The heat absorbed by CNTs will make the polymer matrix pliable enough to allow OPL mechanisms to occur.

Evaluated blend compositions are summarized in Table 1 below. The films were prepared on glass slides (1×3 inch) using epoxy chambers to contain the polymer in a 13 mm diameter circular space, and films of three different thicknesses (120 µm, 240 µm and 360 µm) were prepared from each polymer blend composition. When an appropriate ratio of the components and polymers was used, good quality films (optically clear with uniform smooth surfaces) were obtained.

A general procedure for the preparation of composite films on glass was as follows. A specific amount of doped HB-PCS was placed in a small vial using a micropipette. The mixture was then diluted, adding more HB-PCS to achieve >50% transmittance. To this, a specific amount of trimethoxysilyl-terminated HB-PCS was added to prepare the blend, followed by a catalytic amount of dibutyltin dilaurate. The polymer blend within a range of 75/25 to 85/15 ratio of HB-PCS to trimethoxysilyl-terminated HB-PCS was found to produce coatings with appropriate properties. The obtained liquid mixture was then used to cast films of different thicknesses. The films were cast on an ordinary glass slide (1×3 inch) (cleaned by flushing nitrogen) on which 13 mm diameter samples (120 µm, 240 µm or 360 µm) were fabricated using ultrathin image chambers (CB Consulting, Inc.) of corresponding thickness.

A fixed volume of polymer blend (i.e., 40 µL, 80 µL, or 120 µL) was introduced using micropipettes into the chambers, and the films were cured in a vacuum oven at 80° C. for four hours. Solid, transparent films of different hues of gray color were obtained. Table 1 below summarize details of the various prepared films.

TABLE 1

Composition of samples for laser blocking evaluation

| Sample No.[1] | Sample name | Substrate | Approx. film thickness (µm) | Filter pore size (µm)[2] | Composition of film[3] |
|---|---|---|---|---|---|
| BL-Glass | Blank | Regular glass | — | — | — |
| BL-BK7 | Blank | BK7 glass | — | — | — |
| 2B-1 | HBP | Regular glass | 240 | — | 75/25 ratio of HB-PCS and trimethoxysilyl-functionalized HB-PCS |
| 2E-1 | HBP | BK7 glass | 240 | — | 75/25 ratio of HB-PCS and trimethoxysilyl-functionalized HB-PCS |
| 3A-1 | HBP-anthracene | Regular glass | 240 | 0.2 | 90/10 ratio of HB-PCS-triethoxysilyl anthracene and trimethoxysilyl-functionalized HB-PCS |
| 3B-1 | HBP-anthracene | Regular glass | 240 | 0.45 | 90/10 ratio of HB-PCS-triethoxysilyl anthracene and trimethoxysilyl-functionalized HB-PCS |
| 4A-1 | HBP-stilbene | Regular glass | 240 | 0.2 | 75/25 ratio of HB-PCS-stilbene-3 and trimethoxysilyl-functionalized HB-PCS |
| 4B-1 | HBP-stilbene | Regular glass | 240 | 0.45 | 75/25 ratio of HB-PCS-stilbene-3 and trimethoxysilyl-functionalized HB-PCS |
| 5A-1 | HBP-sMWNT | Regular glass | 240 | 0.2 | 85/15 ratio of diluted (20x) HB-PCS carbon nanotube (sMWNT) and trimethoxysilyl-functionalized HB-PCS |
| 5B-1 | HBP-sMWNT | Regular glass | 240 | 0.45 | 85/15 ratio of diluted (20x) HB-PCS carbon nanotube (sMWNT) and trimethoxysilyl-functionalized HB-PCS |
| 6A-1 | HBP-sMWNT-anthracene | Regular glass | 240 | 0.2 | Stock HB-PCS-sMWNT and HBPCS-triethoxysilyl anthracene suspensions were blended in 73/27 ratio. Then, this suspension was blended with trimethoxysilyl-functionalized HB-PCS in 92/8 ratio. |
| 6B-1 | HBP-sMWNT-anthracene | Regular glass | 240 | 0.45 | Stock HB-PCS-sMWNT and HBPCS-triethoxysilyl anthracene suspensions were blended in 73/27 ratio. Then, this suspension was blended with trimethoxysilyl-functionalized HB-PCS in 92/8 ratio. |
| 7A-1 | HBP-sMWNT-stilbene | Regular glass | 240 | 0.2 | Stock HB-PCS-MWNT and HB-PCS-Stilbene-3 suspensions were blended in 70/30 ratio. Then, this suspension was blended with trimethoxysilyl-functionalized HB-PCS in 82/18 ratio |
| 7B-1 | HBP-sMWNT-stilbene | Regular glass | 240 | 0.45 | Stock HB-PCS-MWNT and HB-PCS-Stilbene-3 suspensions were blended in 70/30 ratio. Then, this suspension was blended with trimethoxysilyl-functionalized HB-PCS in 82/18 ratio |

TABLE 1-continued

Composition of samples for laser blocking evaluation

| | | | | | |
|---|---|---|---|---|---|
| 8A-1 | HBP-anthracene-stilbene | Regular glass | 240 | 0.2 | Stock HB-PCS-triethoxysilyl anthracene and HB-PCS-Stilbene-3 suspensions were blended in 50/50 ratio. The suspension was diluted (1.8x) with HB-PCS. Then, this suspension was blended with trimethoxysilyl-functionalized HB-PCS in 95/5 ratio |
| 8B-1 | HBP-anthracene-stilbene | Regular glass | 240 | 0.45 | Stock HB-PCS-triethoxysilyl anthracene and HB-PCS-Stilbene-3 suspensions were blended in 50/50 ratio. The suspension was diluted (1.8x) with HB-PCS. Then, this suspension was blended with trimethoxysilyl-functionalized HB-PCS in 95/5 ratio. |
| 9A-1 | HBP-sMWNT-anthracene-stilbene | Regular glass | 240 | 0.2 | 90/10 ratio of diluted (5x) HB-PCS-sMWNT-triethoxysilyl anthracene-stilbene-3 and trimethoxysilyl-functionalized HB-PCS |
| 9B-1 | HBP-sMWNT-anthracene-stilbene | Regular glass | 240 | 0.45 | 90/10 ratio of diluted (5x) HB-PCS-sMWNT-triethoxysilyl anthracene-stilbene-3 and trimethoxysilyl-functionalized HB-PCS |
| 9C-1 | HBP-sMWNT-anthracene-stilbene | BK7 glass | 240 | 0.45 | 90/10 ratio of diluted (5x) HB-PCS-sMWNT-triethoxysilyl anthracene-stilbene-3 and trimethoxysilyl-functionalized HB-PCS |
| 9D-1 | HBP-sMWNT-anthracene-stilbene | Regular glass | 360 | 0.45 | 90/10 ratio of diluted (5x) HB-PCS-sMWNT-triethoxysilyl anthracene-stilbene-3 and trimethoxysilyl-functionalized HB-PCS |
| 9E-1 | HBP-sMWNT-anthracene-stilbene | Regular glass | 120 | 0.45 | 90/10 ratio of diluted (5x) HB-PCS-sMWNT-triethoxysilyl anthracene-stilbene-3 and trimethoxysilyl-functionalized HB-PCS |

[1]All samples have prefix SR-737-65-.
[2]Pore size of syringe filter for final purification of samples.
[3]Doping concentrations of nanoparticles in undiluted composition were as follows: 1.6 wt % sMWNTs; 0.3 wt % anthracene; 0.3 wt % stilbene-3.

| Sample no.[1] | Sample name | Substrate | Approx. film thickness (μm) | Filter pore size (μm)[2] | Percentage transmittance (% T)[4] | Composition of the film[5] |
|---|---|---|---|---|---|---|
| 103-1A | HBP-sMWNT-POPOP | Regular glass | 120 | 0.45 | ~70% | 90/10 blend of HBP-sMWNTPOPOP and trimethoxysilyl-functionalized HB-PCS |
| 108-1B | HBP-sMWNT-POPOP | Regular glass | 120 | 0.45 | ~60% | 90/10 blend of HBP-sMWNTPOPOP and trimethoxysilyl-functionalized HB-PCS |

[1]All samples have prefix SR-737-65-.
[2]Pore size of syringe filter for final purification of samples.
[3]Doping concentrations of nanoparticles in undiluted composition were as follows: 1.6 wt % sMWNTs; 0.3 wt % anthracene; 0.3 wt % stilbene-3. The doping concentrations of nanoparticles in the undiluted composition are as follows: 1.6 wt % sMWNT; 1 wt % POPOP.
[4]Percentage transmittance at 532 nm.

EXAMPLE 10

Evaluation of Optical Transparency of the Films

Figure 2:
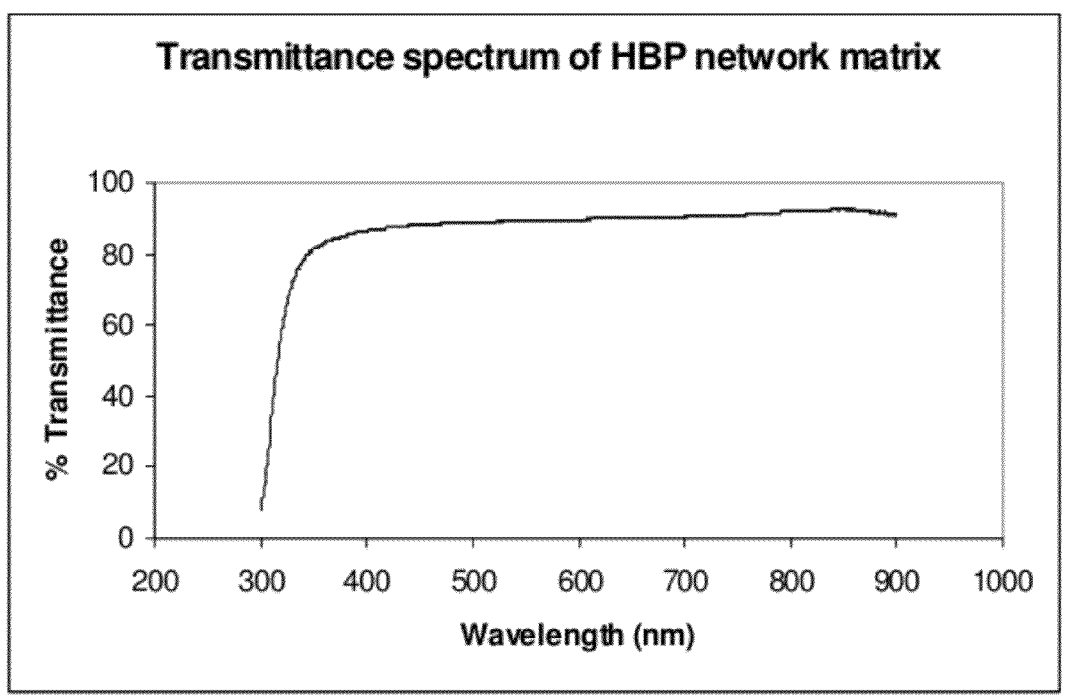
FIG. 2 shows the transmittance spectrum of a film prepared from a 75/25 HB-PCS/trimethoxysilyl-functionalized HB-PCS polymer blend with no additives coated on an ordinary glass slide.
Figure 3:
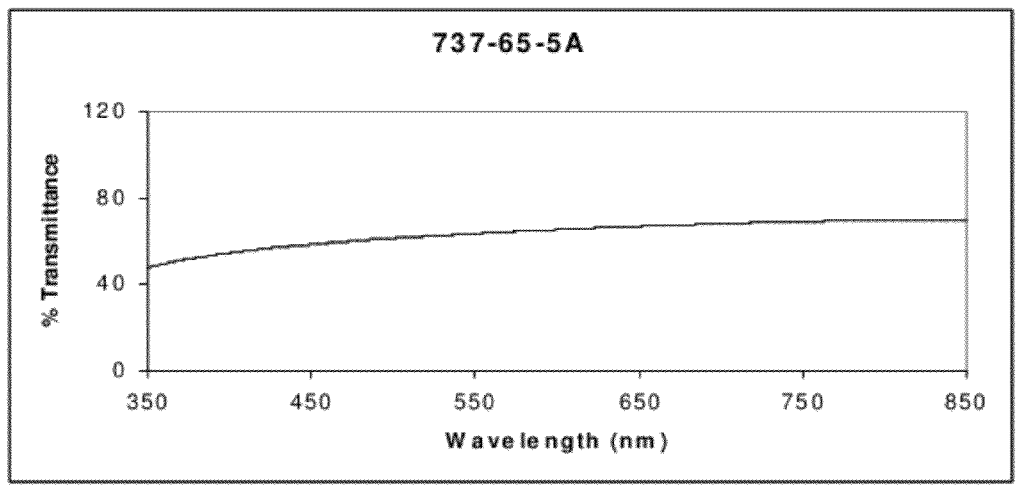
FIG. 3 shows percentage transmittance across the selected sample: (a) 5A-1 and (b) 2B-1 as identified in Table 1.
Figure 3:
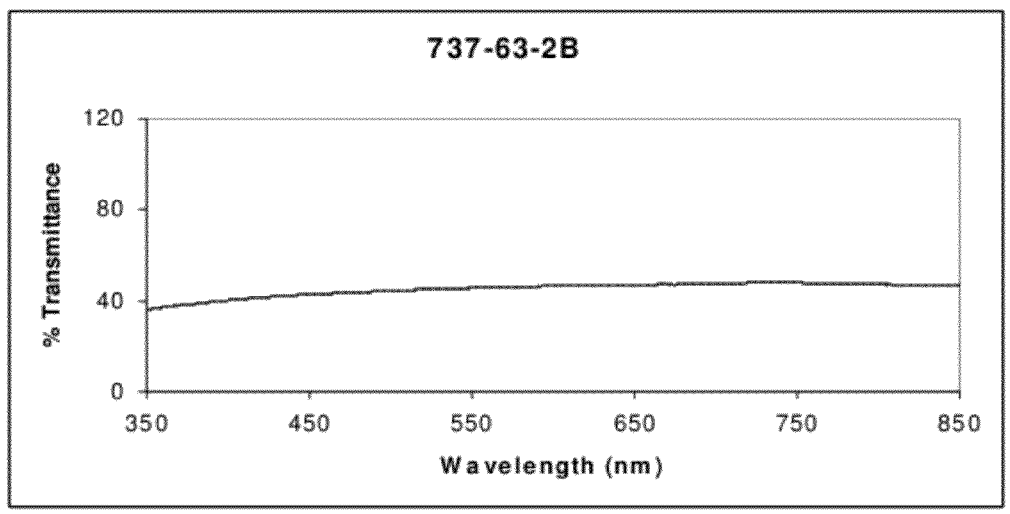

Light transparency of a 75/25 HB-PCS/trimethoxysilyl-functionalized HB-PCS polymer blend with no additives was evaluated using a Varian UV-visible spectrophotometer using a solid film holder accessory (see FIG. 2). The transmission spectrum was recorded over the broad visible range (300 nm to 900 nm) for a ~200 μm thick film. Both the control (i.e., an ordinary glass slide) and the HB-polymer blend on the control slide had identical transmission of approx. 90% throughout the 400 to 900 nm region, clearly demonstrating that the base polymer blend had ideal transparency to normal light. It was also possible to obtain the desired transmittance from the loaded HBP polymer blends by adjusting the concentrations of the components (sMWNTs, stilbene-3 and/or anthracene). For example, the percentage transmittances (% T) of a 240 μm thick film from an 85/15 HB polymer blend and, 1.6 wt % sMWNTs is shown in FIG. 3.

EXAMPLE 11

Evaluation of Film Morphology

High magnification (350× to 500×) optical microscopy (Leitz Leica Polarizing Compound Microscope, Model HM-POL SM-LUX-POL with a 32× objective and a 10× eyepiece) revealed that all films were uniform and devoid of excessive bubbles. The particulate components were nano-sized and uniformly distributed, most likely the result of the HB polymer architecture and interactions between the functional groups of the polymers and dopants.

EXAMPLE 12

Relationship Between Heat Capacity of the Polymer Network and Laser Energy

Figure 4:
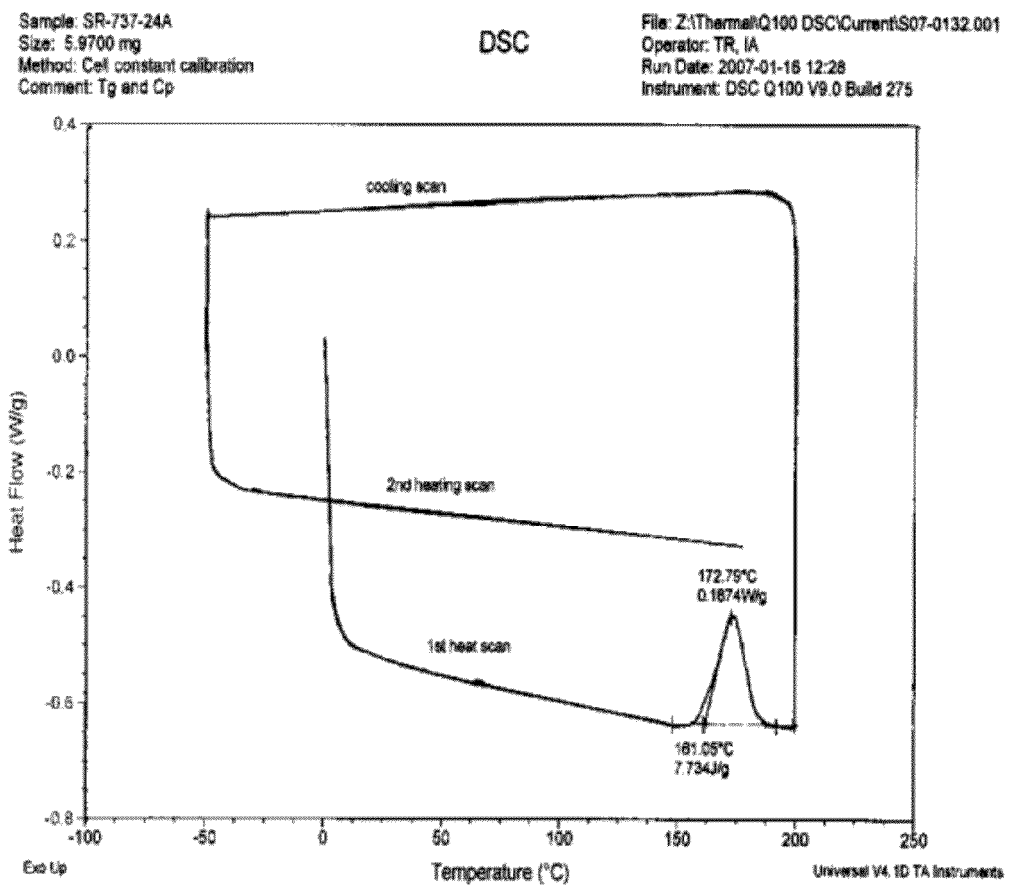
FIG. 4 shows a DSC heat flow scan of polymer sample 24A from a 75/25 blend of HB-PCS and trimethoxysilyl-functionalized HB-PCS.
Figure 5:
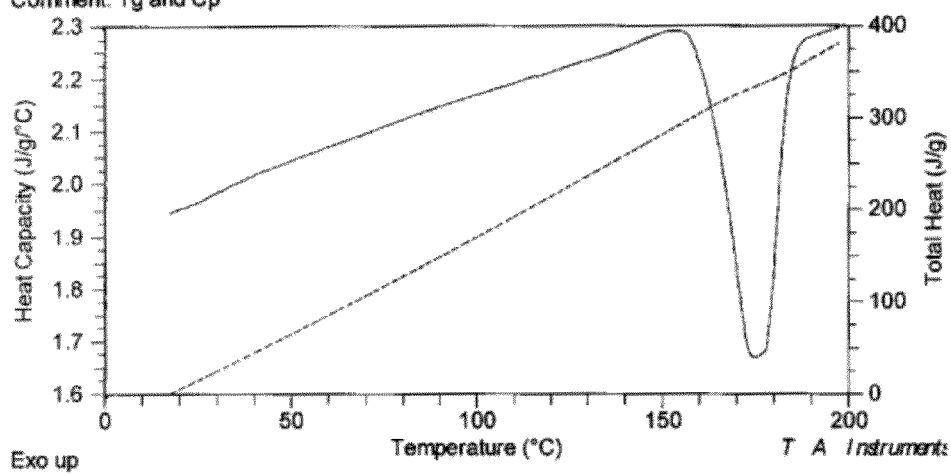
FIG. 5 shows a DSC heat capacity scan of polymer sample 24A from a 75/25 blend of HB-PCS and trimethoxysilyl-functionalized HB-PCS.

The laser irradiation that is used in the laser blocking experiments transfers considerably high fluence into the Polymer Matrix. Therefore, it is important to know what happens to the polymer coating on laser impingement. Toward this objective, a 75/25 blend was evaluated by DSC. First, a heat flow scan was recorded against temperature (see FIG. 4) and it revealed that the blend underwent an exothermic reaction between 160° and 190° C., where it turned dark brown. Following this, a heat capacity scan was recorded against temperature (see FIG. 5) yielding the energy required for reaching the exotherm from:

$$Q = C \times \Delta T$$

Where: C=heat capacity in J/g/° C., ΔT=change in temperature in ° C., and Q=energy in J/g. This gave the energy Q required by the Polymer Matrix to reach a temperature of 170° C. starting from 20° C. (with an average C of 2.17 J/g/° C.) of 325.5 J/g.

It would be desirable to get a lower exotherm for the Polymer Matrix so that the OPL threshold occurs at 2 µJ. Assuming a 400 µm thick polymer film, a spot of 6 µm diameter will need approx. 0.004 µJ of laser pulse energy for the exothermic reaction to occur. A thinner film (~100 µm thickness) will have considerably lower threshold energy for the exothermic reaction. Therefore, it can be concluded that the base Polymer Matrix chosen for this use is appropriate for the creation of instant blocking laser protection material.

EXAMPLE 13

Evaluation of Optical Power Limiting (OPL) Properties of Films Coated on Glass

Figure 6:
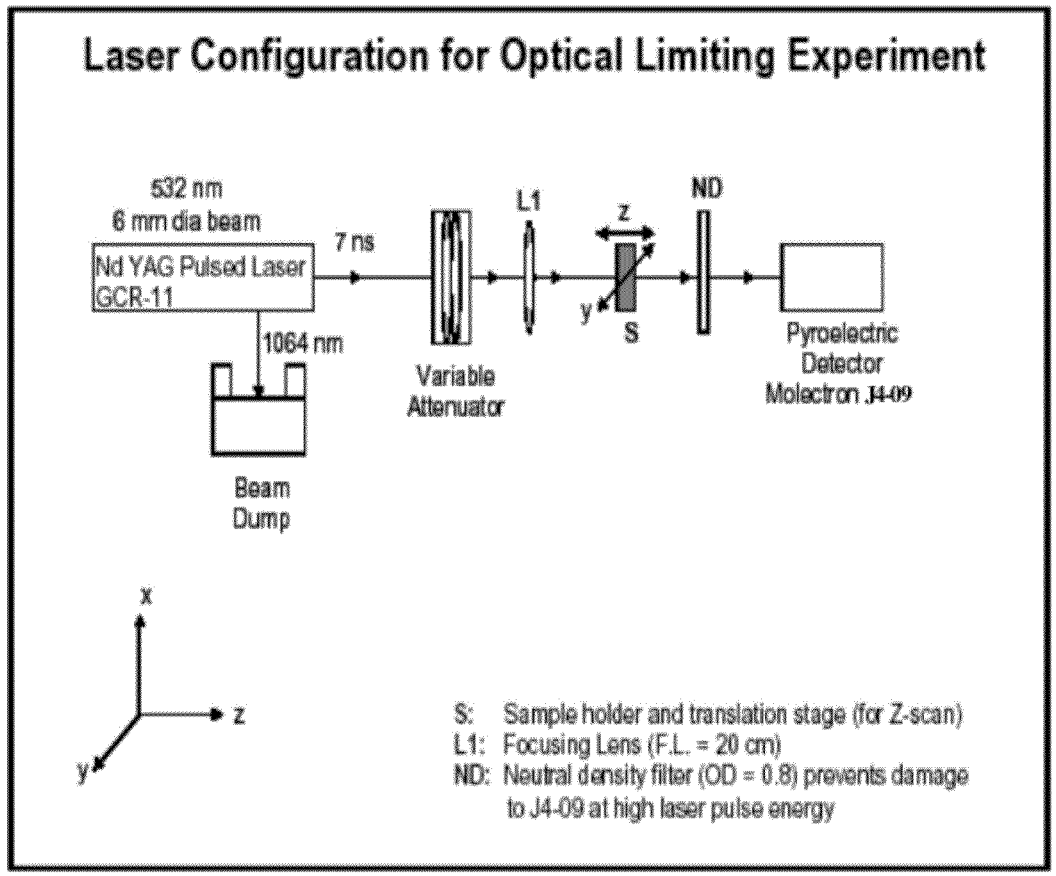
FIG. 6 illustrates the laser configuration for the OPL experiments.

Representative samples (films coated on glass slides) were evaluated at Aquarious, Inc. for their OPL and laser blocking properties. The laser was not focused by a lens for the initial experiments. Initially, a laser set-up shown in FIG. 6 was used to evaluate the samples. The output power of the laser beam was measured in mV using a pyroelectric detector. The calibration for the pyroelectric detector (J4-09) was 0.8 V/mJ.

Two representative samples of Table 2 below were evaluated first. These two samples were the most uniform and above the 50% transmittance range. The objective of this experiment was (1) to test whether the pure polymer film exhibits some OPL character, and (2) to check whether at low light intensity, the doped polymer film behaves normally (linearly) and does not limit intensity.

TABLE 2

Film samples for laser blocking evaluation

| Sample No. | Film thickness[1] | Composition |
|---|---|---|
| SR-A | 240 µm<br>Filter pore size: 0.2 µm | 75/25 blend of HB-PCS &<br>trimethoxysilyl-functionalized HB-PCS |
| SR-4B | 240 µm<br>Filter pore size: 0.2 µm | 90/10 blend of HB-PCS-sMWNT +<br>trialkoxysilyl anthracene (0.3 wt %) +<br>stilbene (0.3 wt %) & trimethoxysilyl-<br>functionalized HB-PCS |

[1]Pore size of syringe filter for final purification of samples.

It was found that the SR-A film did not attenuate laser intensity at any energy level, while the SR-4B film behaved as a normal filter at low intensity of laser light, and attenuated light at higher energy laser light.

Figure 7:
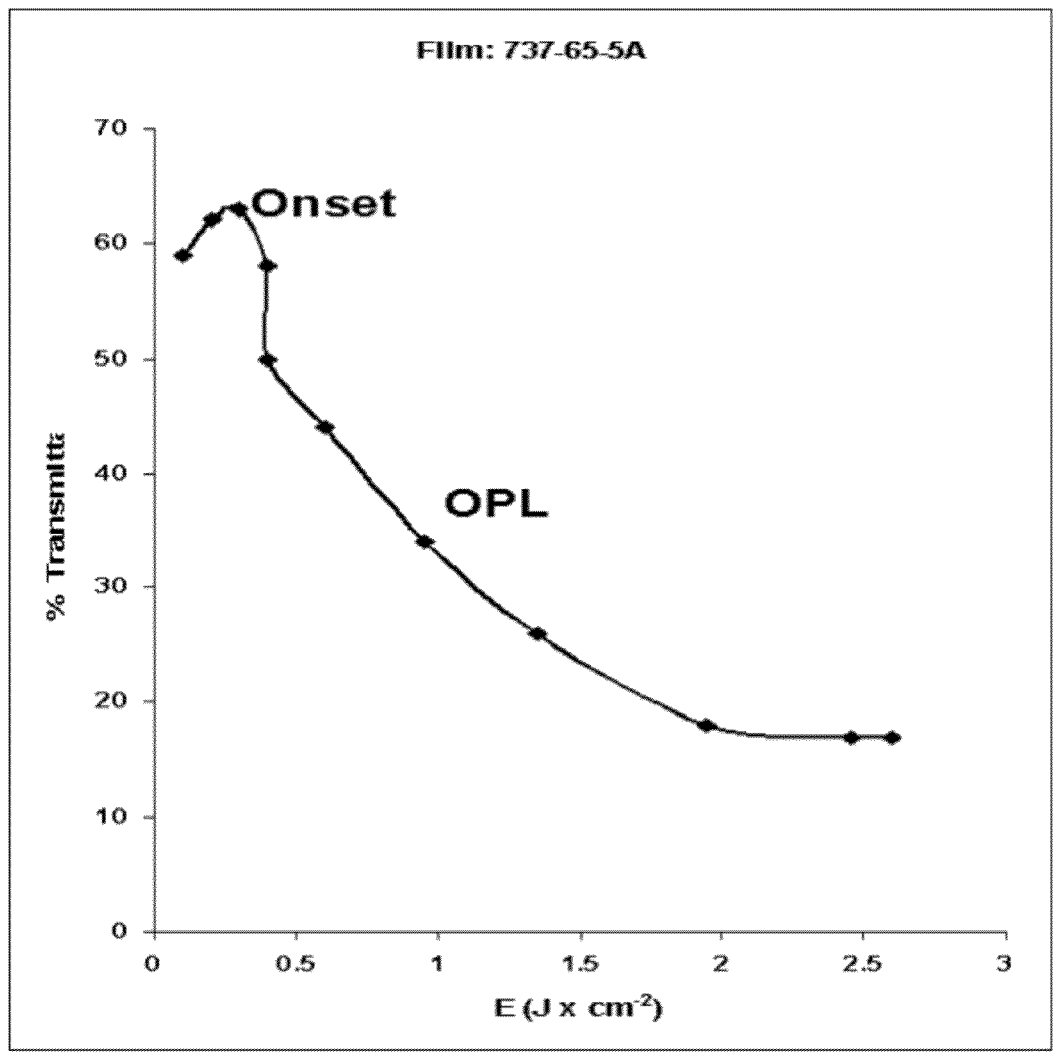
FIG. 7 shows the transmittance vs. laser energy for sample SR-737-65-5A (from Table 1). The initial increase in transmission is an artifact, probably noise from scattered light.

A duplicate of SR-737-65-5A (see Table 1 above) gave 65% transmittance at 532 nm. Its % T vs. laser intensity curve is shown in FIG. 7. OPL onset occurred at about 0.3 J, which was very similar to that observed in the liquid systems. Clamping occurred above 2 J. (Since this sample was prepared from the composition obtained after filtering through a 0.2 µm filter, it was expected to have a slightly different transmittance than the sample prepared by filtering through a 0.45 µm filter.)

Figure 8:
FIG. 8 is a copy of a photograph of the laser spot on the dye-doped HBP film.

The spot at which the laser beam hit the sample was evaluated microscopically. Its shape was almost elliptical with major axis, a=~655 µm and minor axis, b=~440 µm (see FIG. 8). If a more focused laser source along with a lens was used, the size of the spot could be reduced by almost two orders of magnitude. This, in turn, would significantly reduce the threshold energy for the OPL effect.

A second batch of samples was also evaluated (see Table 3 below). Two selected samples, namely, SR-737-87-4A with 120 µm path length (T=60%) and a SR-737-87-1A thin film in a sandwich configuration (T=77%) were evaluated for OPL properties in the same measurement configuration described above. The laser was incident on the glass slide of the sample. The OPL onset occurred at less than ~1 µJ of input energy while clamping occurred at ~10 µJ of output energy for the sample SR-737-87-4A while for the sample SR-737-87-1A, the corresponding values are ~1 µJ and ~80 µJ (OD=1.8) for an input energy of 5 µJ.

It was observed that the clamping threshold depends on the percentage loading of OPL chromophores in the samples. This also indicates that a thin film can become as effective as a thicker film (few hundred µm thickness) provided enough OPL chromophores are incorporated in the thin film (such as in a sandwich film configuration).

TABLE 3

Samples for laser blocking evaluation

| Sample no.[1] | Sample name | Substrate | Approx. film thickness (μm) | Filter pore size (μm)[2] | Composition of the film[3] |
|---|---|---|---|---|---|
| 1A | HBP-sMWNT-anthracene-stilbene | Regular glass | Thin film (Sandwich configuration) | 0.45 | 90/10 blend of HB-PCS-sMWNT-triethoxysilyl anthracene-stilbene-3 and trimethoxysilyl-functionalized HB-PCS |
| 2A | HBP-sMWNT | Regular glass | Thin film (Sandwich configuration) | 0.45 | 85/15 blend of diluted (2x) HB-PCS-sMWNT and trimethoxysilyl-functionalized HB-PCS |
| 4A | HBP-sMWNT-anthracene-stilbene | Regular glass | 120 | 0.45 | 90/10 blend of diluted (5x) HB-PCS-sMWNT-triethoxysilyl anthracene-stilbene-3 and trimethoxysilyl-functionalized HB-PCS |
| 5A | HBP-sMWNT-anthracene-stilbene | Regular glass | 120 | 0.45 | 90/10 blend of diluted (10x) HBPCS-sMWNT-triethoxysilyl anthracene-stilbene-3 and trimethoxysilyl-functionalized HB-PCS |
| 8A | HBP-sMWNT-anthracene-stilbene | Regular glass | 240 | 0.45 | 90/10 blend of diluted (1.3x) HBPCS-sMWNT-triethoxysilyl anthracene-stilbene-3 and trimethoxysilyl-functionalized HB-PCS |
| 9A | HBP-sMWNT-anthracene-stilbene | Regular glass | 360 | 0.45 | 90/10 blend of diluted (1.8x) HBPCS-sMWNT-triethoxysilyl anthracene-stilbene-3 and trimethoxysilyl-functionalized HB-PCS |

[1]All of the samples have prefix SR-737-87-.
[2]Pore size of syringe filter for final purification of the suspension.
[3]The doping concentrations of nanoparticles in the undiluted composition were as follows: 1.6 wt % sMWNT; 1 wt % anthracene; 1 wt % stilbene-3.

EXAMPLE 14

Test of HBP-sMWNT Samples with High Fluence Input

Samples SR-737-92-1, SR-737-92-3, SR-737-92-4 (see Table 4) were first examined in the UV-vis spectrophotometer, and sample SR-737-92-1 with film thickness of 240 μm was chosen for further testing (T=38%) base-lined against a clear glass slide.

The laser configuration (shown in FIG. 6) was modified by replacing the lens used for initial evaluation with a Nikon 50 mm F1.8 lens (placed at L1 position in FIG. 6) in order to increase the fluence incident on the film. The sample was placed at the focal point of the lens which was determined by using burn paper and translating the sample back and forth along the z-axis. The focus was much tighter with this lens. The sample was irradiated with 532 nm laser. The sample was moved laterally 1 mm between measurements. The input fluence energy was gradually increased to verify clamping at

TABLE 4

Composition of samples with varying sMWNT concentration

| Sample no.[1] | Sample name | Dilution of stock sMWNT suspension in HB-PCS | Approx. film thickness (μm) | Filter pore size (μm)[2] | Composition of film[3] |
|---|---|---|---|---|---|
| 1 | HBP-sMWNT | 2x | 240 | 0.45 | 85/15 blend of diluted HB-PCS-sMWNT and trimethoxysilyl-functionalized HB-PCS |
| 2 | HBP-sMWNT | 5x | 240 | 0.45 | 85/15 blend of diluted HB-PCS-sMWNT and trimethoxysilyl-functionalized HB-PCS |
| 3 | HBP-sMWNT | 10x | 240 | 0.45 | 85/15 blend of diluted HB-PCS-sMWNT and trimethoxysilyl-functionalized HB-PCS |
| 4 | HBP-sMWNT | 20x | 240 | 0.45 | 85/15 blend of diluted HB-PCS-sMWNT and trimethoxysilyl-functionalized HB-PCS |
| 5 | HBP-sMWNT | 25x | 240 | 0.45 | 85/15 blend of diluted HB-PCS-sMWNT and trimethoxysilyl-functionalized HB-PCS |

Figure 9:
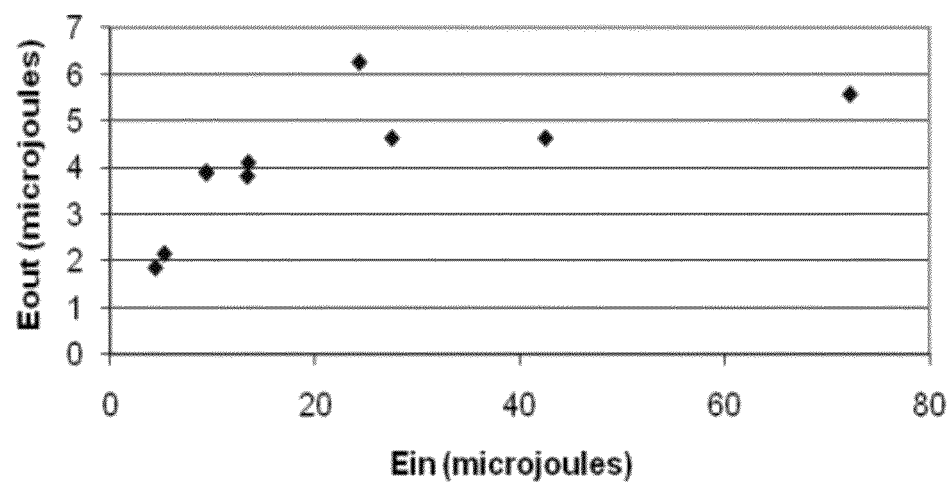
FIG. 9 shows output energy vs. input energy for sample SR-737-92-1 (from Table 5).
Figure 10:
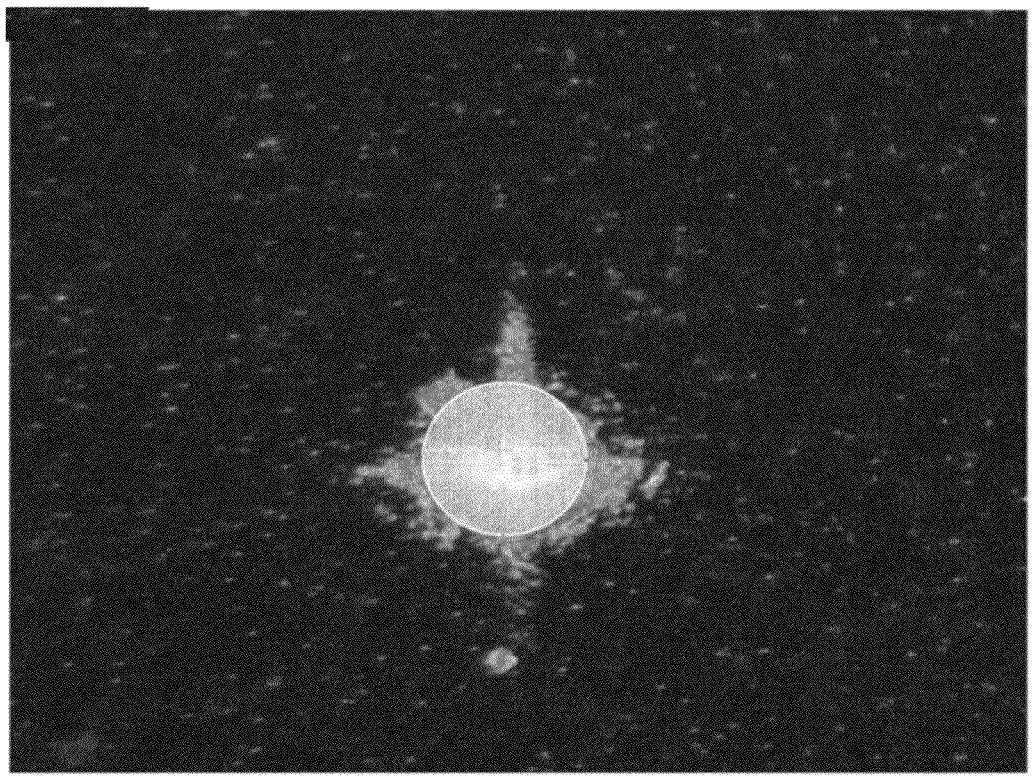
FIG. 10 is a copy of a photograph of the laser spot profile obtained on burn paper that corresponds to that beamed on the dye-doped HBP film SR-737-92-1.

[1]All of the samples have the prefix SR-737-92-.
[2]Pore size of syringe filter for final purification of the suspension.
[3]The doping concentrations of nanoparticles in the undiluted composition are as follows: 1.6 wt % sMWNT.

the higher values that are needed in the optical systems of interest. The onset occurred at ~5 µJ of input energy and clamping of output energy occurred at ~45 µJ The sample was easily able to clamp at even much higher input energy of ~73 µJ (see FIG. 9). It was estimated that the diameter of the spot was at least 10× less than that used before, although the burn paper over estimated the actual laser spot area (see FIG. 10). After five measurements (5 shots, 72 µJ each) at the same spot, the film, which was 240 µm thick, cracked.

These results showed that:

1. the film did not crack at high fluence (energy on the order of 70 µJ) even after multiple exposures (4) at the same spot, however it cracked after the 5$^{th}$ exposure; and
2. the film exhibited good optical limiting (0.02 mJ out for 0.410 mJ in) and clamping with no evidence of bleaching or burn through.

Figure 11:
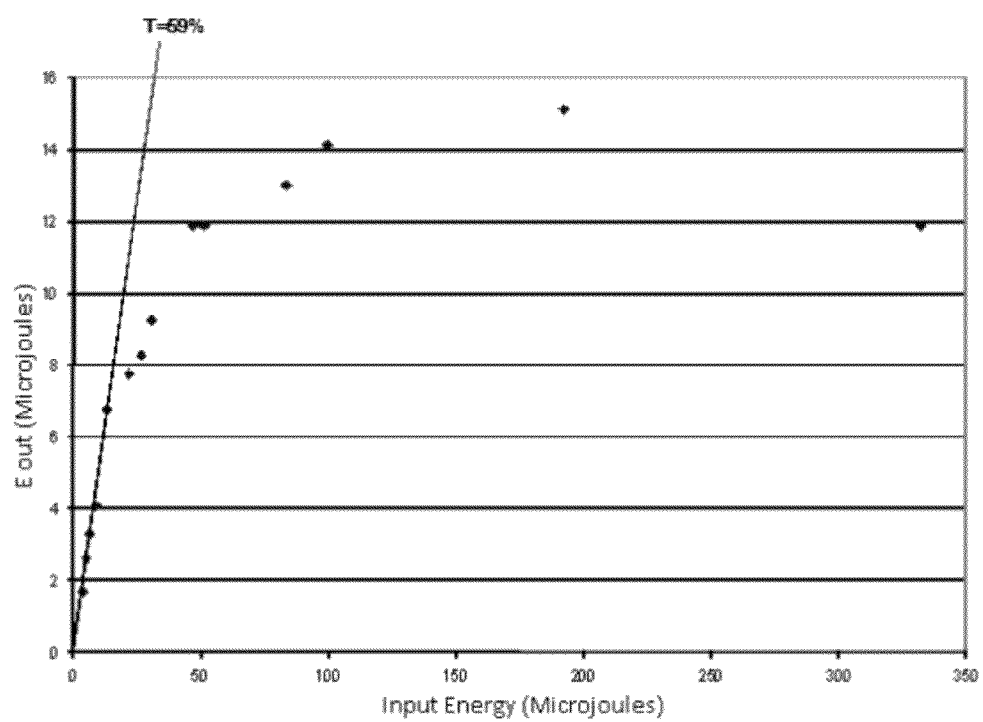
FIG. 11 shows output energy vs. input energy for sample SR-737-108-1B (from Table 2).

Subsequently, a third batch of samples, that contained the POPOP chromophore in place of stilbene-3, was screened (Table 1). Sample SR-737-108-1B was selected for evaluation of OPL properties. This sample had a transmittance of 59% and a film thickness of 120 µm. For the evaluation, a similar laser set up as described in the preceding description was used. FIG. 11 shows the plot of energy in vs. energy out values. The OPL onset occurred at 13 µJ of input energy. The clamping occurred at ~12 µJ of output energy and the sample was easily able to clamp at a much higher input energy of ~330 µJ.

EXAMPLE 15

Sandwich Film Configuration to Control Cracking

A film in a sandwich configuration 737-94-1A2 (duplicate of the sample SR-737-87-1A in Table 4), was prepared by fitting the polymer film between two glass plates. The laser configuration was the same as described in the preceding section. The following data (Table 5) was obtained from the OPL experiments.

TABLE 5

| 737-94-1A2 | | sandwich film; edge of film delaminated | | |
|---|---|---|---|---|
| Vin (mV) | Ein | Vout (mV) | Eout | V = detector voltage E in microjoules |
| 45 | 56.25 | 4.6 | 5.75 | did not move film between these measurements |
| 36 | 45 | 4.5 | 5.625 | |
| 54 | 67.5 | 5.2 | 6.5 | |
| 62.7 | 78.375 | 5.4 | 6.75 | |
| 74 | 92.5 | 5.9 | 7.375 | no cracking to this point |
| | 0 | | 0 | |
| | 0 | | 0 | |
| 343 | 428.75 | 7.1 | 8.875 | film has low transmission, but damage at focus spot |
| 293 | 366.25 | 11.5 | 14.375 | |
| | 0 | 4.9 | 6.125 | after 7 shots in same place; transmission decreased |
| | 0 | | | |
| 327 | 408.75 | | | 7 shots in sequence caused film to crack |

It was found that increasing the input energy to 428 µJ did not cause the film to crack even though damage at the focus spot was observed. Repeated laser shots at the same spot did not cause the film to crack. Therefore, it is inferred that sandwiching the film makes it more robust and crack-proof allowing it to go to higher input energy for the output energy at the same clamping level.

EXAMPLE 16

Blending of MPA and RSA Chromophores into Polymer Films

A series of MPA and RSA chromophores, selected with specific attributes, were introduced into the polymer film composition at different loading concentrations. The purpose of these experiments was to obtain a film composition with optimum concentrations of MPA and RSA chromophores that meet the requirements for laser blocking.

CNTs are excellent OPL materials but have two limitations: 1) they need some time to react to the laser irradiation (in the nanosecond range), and 2) the input energy threshold is somewhat higher than a laser protection system needs to be. Introduction of MPA dyes help to alleviate these two limitations, because due to their excitonic mechanism these have an inherently faster OPL response (in the pico second range). On the other hand, RSA dyes exhibit OPL at lower threshold input energies compared to CNTs and MPAs. One limitation of MPA and RSA chromophores is that they don't have a broadband response. However, a set of these chromophores can be used to address different parts of the broadband wavelength. Therefore, to get faster response as well as lower input threshold energy, a combination of MPA and RSA chromophores have been used in the polymer blend composition. These blends were applied as thin film coatings on a transparent substrate such as glass to evaluate optical limiting properties and film stability.

(a) MPA Chromophores: In addition to the two chromophores (Stilbene-3 and POPOP), dansyl hydrazine is also a promising MPA chromophore because of its absorption spectra and high first order hyperpolarizability. These chromophores have been introduced into the blend by the process of homogenization followed by ultrasonication, and the OPL properties of the obtained formulations were evaluated.

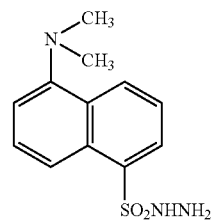

Dansyl hydrazine (b) RSA Chromophores: Similarly, four RSA chromophores: HIDCI, Siver phthalocuyanine, vanadyl naphthalocyanine and silver nanoparticles (structures of the RSA chromophores are shown below) were also evaluated.

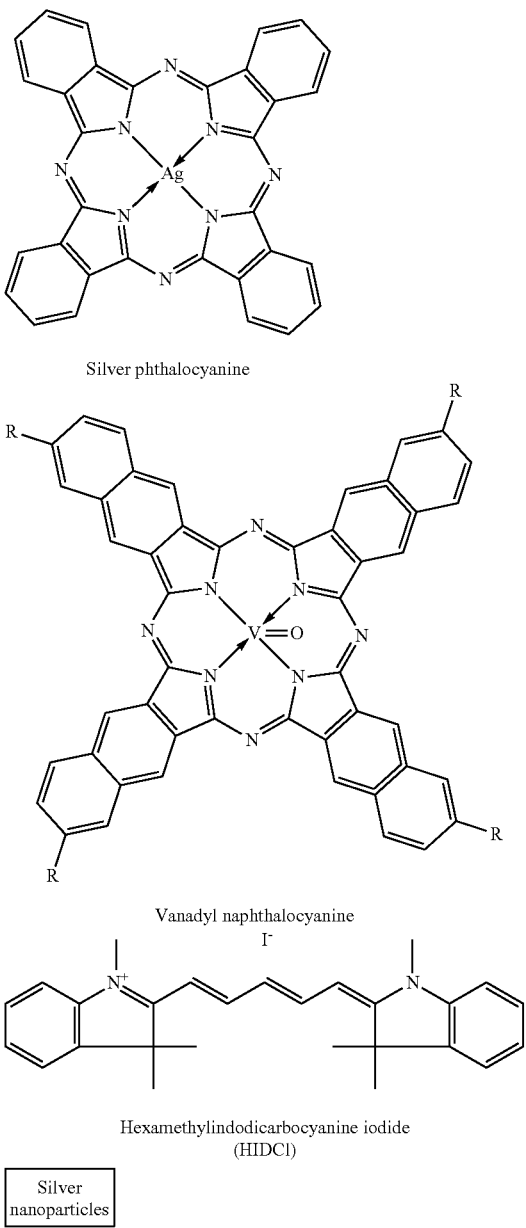

Silver phthalocyanine

Vanadyl naphthalocyanine

Hexamethylindodicarbocyanine iodide (HIDCI)

Silver nanoparticles

EXAMPLE 17

Blending of Carbon-Rich Molecules into the Polymer Films

A number of other carbon-rich molecules described above have been introduced into the polymer film composition. The judicious choice of these carbon-rich molecules enhances the laser blocking properties of the polymer film. Functionalization of these molecules is desirable in order to introduce them into the polymer blend without causing phase separation.

Carbon-rich molecules are known to liberate carbon as a decomposition product when irradiated with intense laser beams. This causes instant blackening so that the incorporation of carbon-rich organic molecules in addition to functionalized CNT, MPA and RSA chromophores provides an additional mechanism for protection against high intensity lasers.

It should be noted that graphidymes should also act as MPA chromophores when substituents $R_1$ through $R_6$ are chosen to form donor-acceptor pairs.

EXAMPLE 18

Optical Properties of Epoxy Based Films (A) Loading of sMWNT-COOH into Epoxy sMWNT-COOH (0.12 g) was added to the less viscous component of the commercially available epoxy resin pair (6 mL) and sonicated by a sonicator (Vibra Cell, Sonics and Materials Inc., USA) in a continuous process for 3 h (duty 50% and amplitude 30). A water bath was used to control sample temperature as well as to avoid thermochemical reaction and gel formation. The suspension obtained as a result of ulrasonication was very highly viscous and not possible to filter by a syringe filter. The final product was too dark in color and a few visible particles were observed at the bottom of the beaker. The suspension was stable. For the sample with sMWNT-COOH, $C_{60}$, stilbene, and Disperse Red 1 Acrylate, the components were added with 6 mL Epoxy (less viscous) with the ratio of 1.5:1:1:1 (i.e., 0.015 g, 0.01 g, 0.01 g, and 0.01 g).

(B) Fabrication of the Film

Specific amounts, depending on the dimension of the target film, of sMWNT-COOH loaded epoxy (1 drop) were diluted using same matrix (4 drops) mixed with the other epoxy matrix (5 drops) and cast on a glass substrate. The film surface was not very uniform and lots of air bubbles were trapped in the film. Three types of films were prepared:
1) Epoxy only film
2) sMWNT-COOH/epoxy film
3) sMWNT-COOH/$C_{60}$/stilbene/Disperse Red 1 Acrylate/epoxy film Table 6 below summarizes their properties.

TABLE 6

Details of the epoxy based films.

| Number of samples | Sample composition | Approximate Thickness (μm) | Approximate Transmittance (%) |
|---|---|---|---|
| SM-780-4-1A | Epoxy | 500 | 56 |
| SM-780-4-2A | sMWNT-COOH/Epoxy | 500 | 29 |
| SM-780-4-3A | sMWNT-COOH/C60/Stilbene/DR1 Acr/Epoxy | 500 | 26 |

Notes:
1) sMWNT-COOH (2.0 wt %) was added to epoxy. The sample was mixed by a mechanical homogenizer for 10 min and then ultrasonicated for 3 h. During sonication, a water bath was used to control the temperature.
2) For sample SM-780-3A, sMWNT-COOH (0.015 g), C60 (0.01 g), Stilbene (0.01 g), and DR 1 Acr (0.01 g) were added with Epoxy (less viscous) (6 mL). The suspensions were processed similarly as sMWNT-COOH for 3 h.
3) In order to get appropriate transmittance, the sMWNT-COOH/epoxy suspension was diluted using same matrix.
4) Thickness of the samples was around 500 μm and diameter was 20 mm.

(C) Morphology and Thickness of Films

Figure 12:
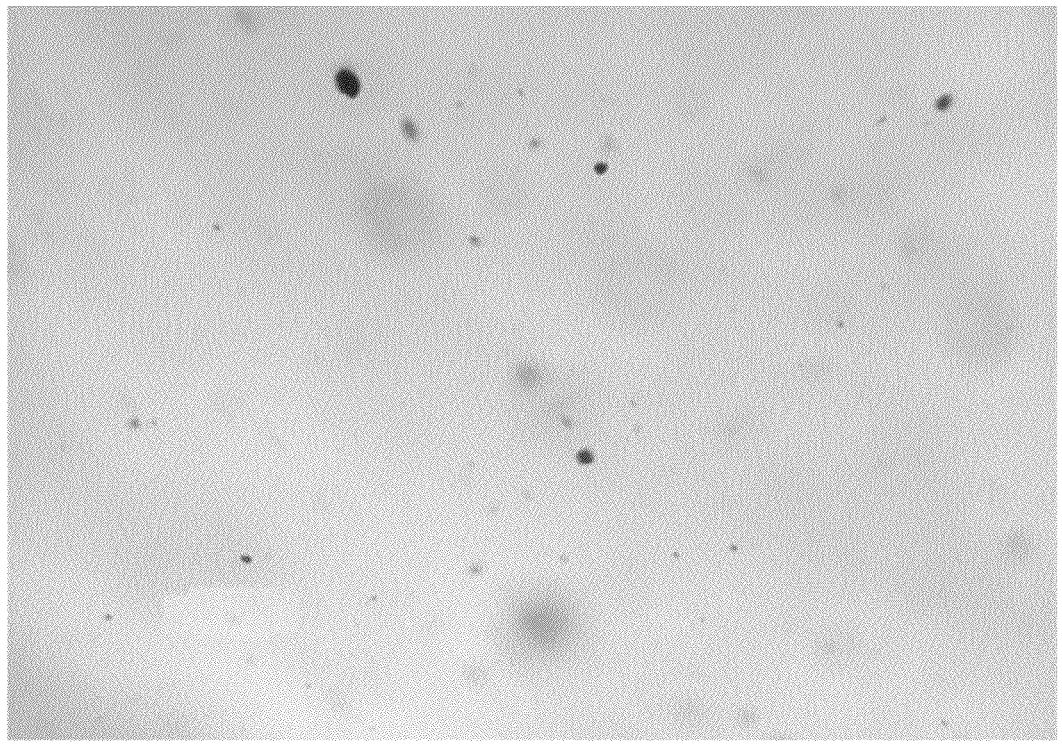
FIG. 12 is a copy of an optical micrograph of sMWNT-COOH/Epoxy film. The objective was 50×. The big black spots are undispersed CNT and the other big less intense spots are air bubbles trapped in the film.

A high resolution optical microscope (Leitz Leica Polarizing Compound Microscope, Model HM-POL SM-LUX-POL) with a 50× objective was used to examine the appearance of solid thin films. Photomicrographs of the films were taken using a digital camera (Diagnostic Instruments, Inc.) controlled by a computer (FIG. 12). The thickness of the films was measured by a digital micrometer screw gauge with a resolution 1 μm.

(D) Evaluation of Optical Transparency of Films

Figure 13:
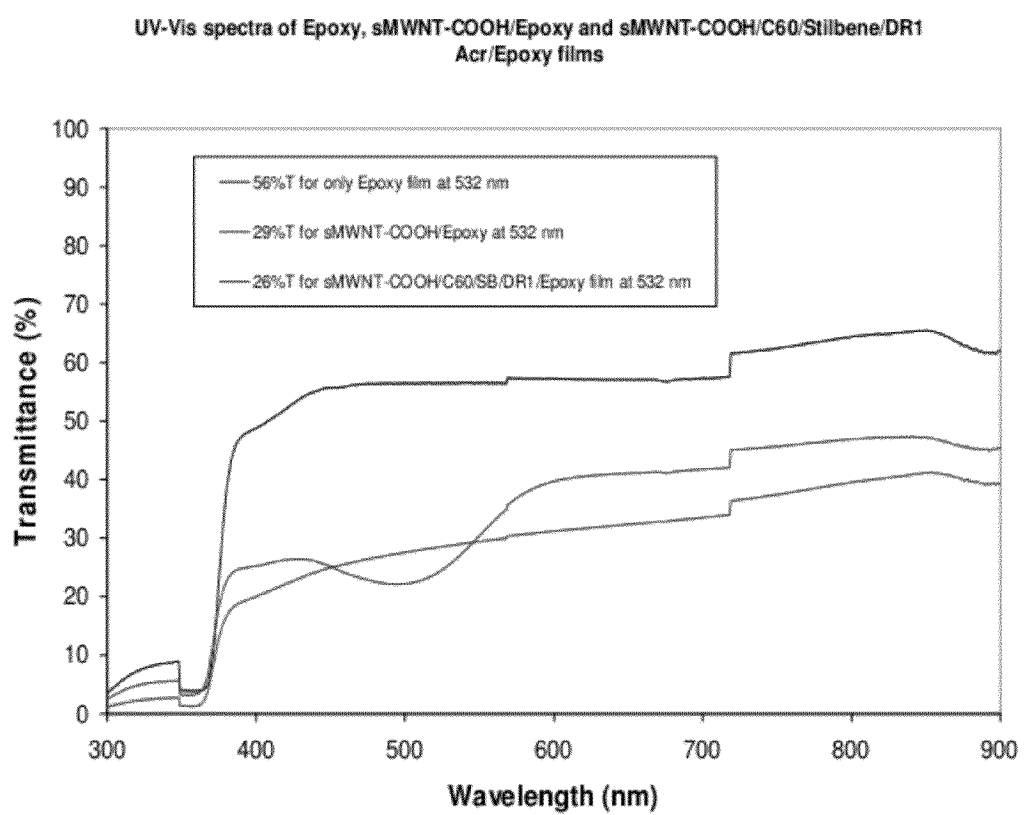
FIG. 13 shows the UV-Vis spectra of epoxy, sMWNT-COOH/Epoxy, and sMWNT-COOH/C60/Stilbene/Disperse Red 1 Acrylate/Epoxy films.

Transmission spectra of solid transparent films on glass slides were recorded on a Varian UV-Visible spectrometer using a solid film holder. FIG. 13 shows the spectra for all films tested. Neat epoxy film showed 56% transmittance over the entire visible range (380 to 780 nm). sMWNT-COOH/epoxy film showed at the transmittance decreased with the decreasing wavelength and showed 29% T at 532 nm. sMWNT-COOH/$C_{60}$/stilbene/DR 1 Acrylate/epoxy film showed similar behavior as sMWNT-COOH/epoxy except for an absorption at around 500 nm This absorption corresponded to DR 1 Acrylate.

(E) Evaluation of OPL Property of Films

All samples (Table 6 above) were evaluated by Aquarious Inc. and showed promising OPL properties. The laser was incident on the glass slide of the sample. The OPL onset occurred at ~1 μJ of input energy while clamping occurred at ~10 μJ of output energy for the samples.

It was observed that the clamping threshold depends on the percentage loading of OPL chromophores in the samples. This also indicates that a thin film can become as effective as a thicker film (few hundred μm thickness) provided enough OPL chromophores are incorporated in the thin film (such as in a sandwich film configuration).

Although the invention has been described with reference to its preferred embodiments, those of ordinary skill in the art may, upon reading and understanding this disclosure, appreciate changes and modifications which may be made which do not depart from the scope and spirit of the invention as described above or claimed hereafter.

What is claimed is:

1. A polymer coating material composition (PCM) comprising as components:
   1) a Polymer Matrix selected from the group consisting of hyperbranched polycarboxysilane polymer, hyperbranched polycarbosiloxane polymer, hyperbranched polyurea siloxane polymer and preparing their functionalized derivatives, and
   2) carbon nanotubes (CNT) as optical power limiters (OPL) having a size from about 0.1 μm to about 5 μm in length and about 1 nm to about 30 nm in diameter; and
   3) carbon-rich molecules that liberate carbon as a decomposition product by instant blackening when irradiated with intense laser beams.

2. The composition according to claim 1, wherein a ratio in weight percent of the Polymer Matrix to the CNT to the carbon-rich molecule is from 94:3:3 to 99.8:0.1:0.1.

3. The composition according to claim 1, wherein a ratio in weight percent of the Polymer Matrix to the CNT to the carbon-rich molecule is from 99.0:0.5:0.5 to 99.75:0.125:0.125.

4. The composition according to claim 1, wherein the hyperbranched polymer is a hyperbranched polycarbosiloxane (HB-PCS) or its trimethoxysilyl functionalized derivative.

5. The composition according to claim 1, wherein the carbon nanotubes (CNT) are single wall carbon nanotubes (SWNT), short single wall carbon nanotubes (sMWNT), double wall carbon nanotubes (DWNT), multiwall carbon nanotubes (MWNT), or short multiwall carbon nanotubes (sMWNT).

6. The composition according to claim 5, wherein the carbon nanotubes (CNT) are sMWNT.

7. The composition according to claim 1, wherein the carbon-rich molecule is a triethoxysilyl anthracene derivative, diacetylene derivative that is substituted with benzene or naphthalene, or graphene and graphidyne macrocycles.

8. The composition according to claim 7, wherein the carbon-rich molecule is a triethoxysilyl anthracene derivative.

9. The composition according to claim 1, wherein the composition is not a solvent-less system.

10. The composition according to claim 1, further comprising as an additional component multi-photon absorber (MPA) chromophores.

11. The composition according to claim 10, wherein a ratio in weight percent of the Polymer Matrix to the CNT to the carbon-rich molecules to the MPA chromophores is from 91:3:3:3 to 99.7:0.1:0.1:0.1.

12. The composition according to claim 10, wherein the MPA is stilbene-3, dansyl hydrazine or 1,4-bis(5-phenyloxazoyl-2-yl)benzene (POPOP).

13. The composition according to claim 12, wherein the MPA is stilbene-3.

14. The composition according to claim 1, further comprising as an additional component reverse saturable absorber (RSA) chromophores.

15. The composition according to claim 14, wherein a ratio in weight percent of the Polymer Matrix to the CNT to the carbon-rich molecules to the RSA chromophores is from 91:3:3:3 to 99.7:0.1:0.1:0.1.

16. The composition according to claim 14, wherein the RSA is an organic or organometallic molecule.

17. The composition according to claim 16, wherein the organometallic molecule is 1,1',3,3,3',3'-hexamethylindotricarbocyanine iodide (HITCI), 1,1',3,3,3',3'-hexamethylindodicarbocyanine iodide (HIDCI), zinc tetraphenyl porphyrin (Zn-TPP), lead phthalocyanine or silver nanoparticles.

18. The composition according to claim 16, wherein the organic molecule is fullerene ($C_{60}$).

19. The composition according to claim 1, further comprising as additional components MPA chromophores and RSA chromophores.

20. The composition according to claim 19, wherein a ratio in weight percent of the Polymer Matrix to the CNT to the carbon-rich molecules to the MPA chromophores to the RSA chromophores is from 88:3:3:3:3 to 99.6:0.1:0.1:0.1:0.1.

21. The composition according to claim 19, wherein the additional components are present comprising the MPA is stilbene-3, and the RSA is fullerene ($C_{60}$).

22. The composition according to claim 1, wherein the Polymer Matrix is hyperbranched polycarbosiloxane (HB-PCS) or its trimethoxysilyl functionalized derivative; the carbon nanotubes (CNT) as optical power limiters (OPL) are short multiwall carbon nanotubes (sMWNT); and the carbon-rich molecules are a triethoxysilyl anthracene derivative.

23. A coating prepared from the composition according to claim 1.

* * * * *